United States Patent
Armitage

(10) Patent No.: US 9,582,612 B2
(45) Date of Patent: Feb. 28, 2017

(54) SPACE CONSTRAINED ORDERED LIST PREVIEWS

(71) Applicant: John Armitage, Berkeley, CA (US)

(72) Inventor: John Armitage, Berkeley, CA (US)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 14/150,103

(22) Filed: Jan. 8, 2014

(65) Prior Publication Data

US 2015/0193094 A1    Jul. 9, 2015

(51) Int. Cl.
    *G06F 17/30*    (2006.01)
    *G06F 3/0485*    (2013.01)
    *G06T 11/20*    (2006.01)

(52) U.S. Cl.
    CPC ...... *G06F 17/30994* (2013.01); *G06F 3/0485* (2013.01); *G06F 3/04855* (2013.01); *G06T 11/206* (2013.01)

(58) Field of Classification Search
    CPC ... G06T 11/206; G06F 3/0485; G06F 3/04855
    See application file for complete search history.

(56) References Cited

U.S. PATENT DOCUMENTS

| | | | | |
|---|---|---|---|---|
| 6,704,016 B1* | 3/2004 | Oliver | ................... | G06F 3/0485 345/440.2 |
| 7,551,188 B2* | 6/2009 | Ahokas | ................. | G06F 3/0485 345/684 |
| 8,732,597 B2* | 5/2014 | Ludolph | ............... | G06F 3/0485 715/764 |
| 2005/0002496 A1* | 1/2005 | Dodge et al. | ............... | 379/32.01 |
| 2010/0214300 A1* | 8/2010 | Alsbury | ................ | G06T 11/206 345/440.2 |
| 2011/0025717 A1* | 2/2011 | Gilmore | .............. | G06F 3/04855 345/661 |
| 2011/0084967 A1* | 4/2011 | De Pauw | .............. | G06F 3/0481 345/440 |
| 2014/0282184 A1* | 9/2014 | Dewan et al. | ................ | 715/771 |

OTHER PUBLICATIONS

Spreading the Wealth. The Economist. Oct. 21, 2008. <http://www.economist.com/node/12454152>.*
Games, Peter S., and Alark Joshi. "Visualization of Off-screen Data on Tablets Using Context-providing Bar Graphs and Scatter Plots." Visualization and Data Analysis. Feb. 3, 2014 (2013): n. pag. Web.*

* cited by examiner

*Primary Examiner* — Jennifer To
*Assistant Examiner* — Liang Li
(74) *Attorney, Agent, or Firm* — Fountainhead Law Group P.C.

(57) ABSTRACT

Systems and methods for generating previews of list data in space constrained user interfaces are disclosed. In the available display area of a particular display device or user interface, a segment of a list of items are displayed. Values in the on-screen and off-screen portions of the list are analyzed and processed to generate previews of the list. One preview includes generating a box plot of the distribution of values in the list. An adaptively sized slider can then be generated relative to the box plot to indicate which part of the distribution is displayed in the list items that fit in the available display area. Another preview includes generating a composite row in the available display area that summarizes the data in one or more of the off-screen portions of the list. Such previews can include the sum or average of the values in the off-screen list items.

20 Claims, 19 Drawing Sheets

| List Item 1 | 26 |
| --- | --- |
| List Item 2 | 21 |
| List Item 3 | 15 |
| List Item 4 | 9 |
| List Item 5 | 6 |
| List Item 6 | 5 |
| List Item 7 | 4 |
| List Item 8 | 3 |
| List Item 9 | 2.5 |
| List Item 10 | 2 |
| List Item 11 | 1.75 |
| List Item 12 | 1.5 |
| List Item 13 | 1.25 |
| List Item 14 | 1 |
| List Item 15 | 1 |

FIG. 3A

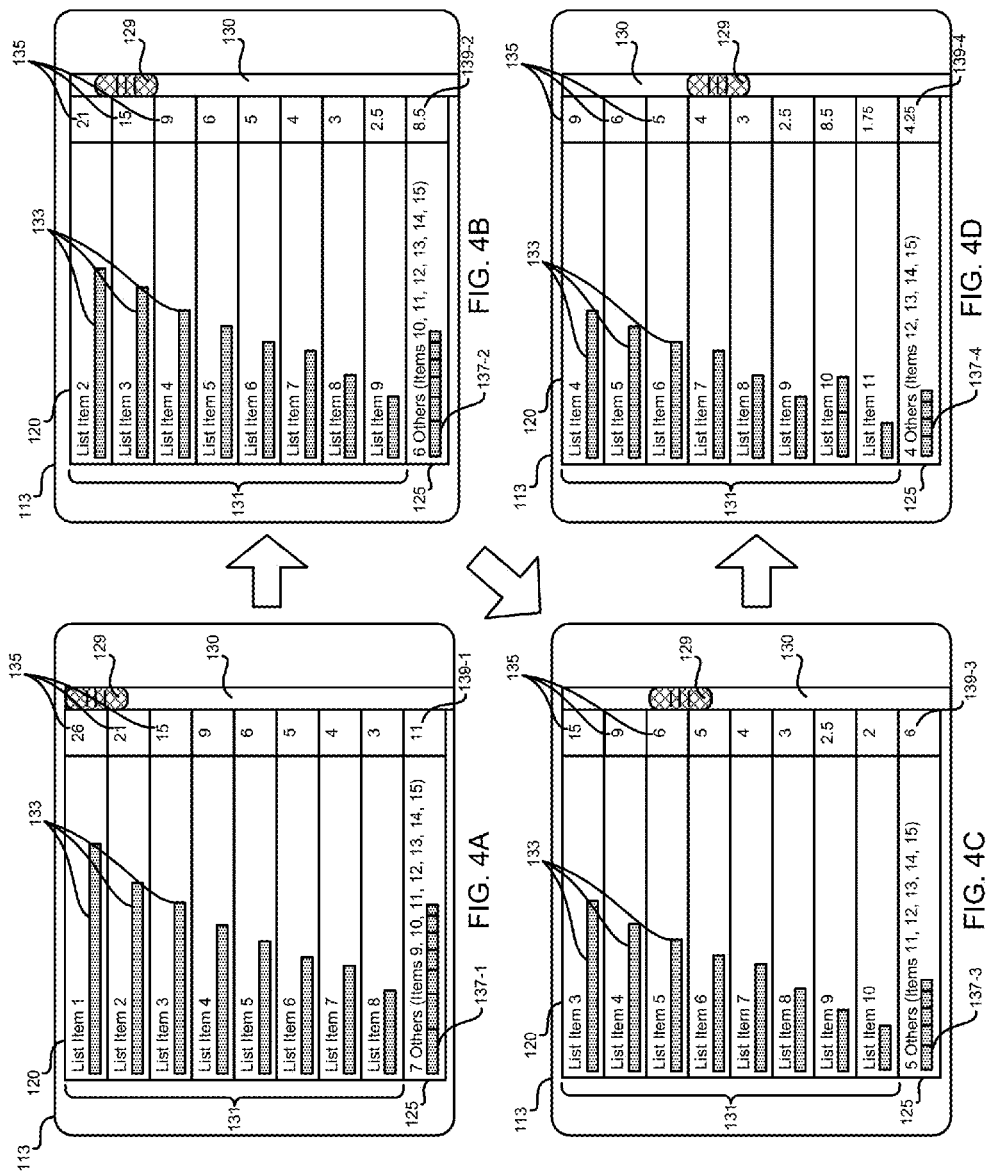

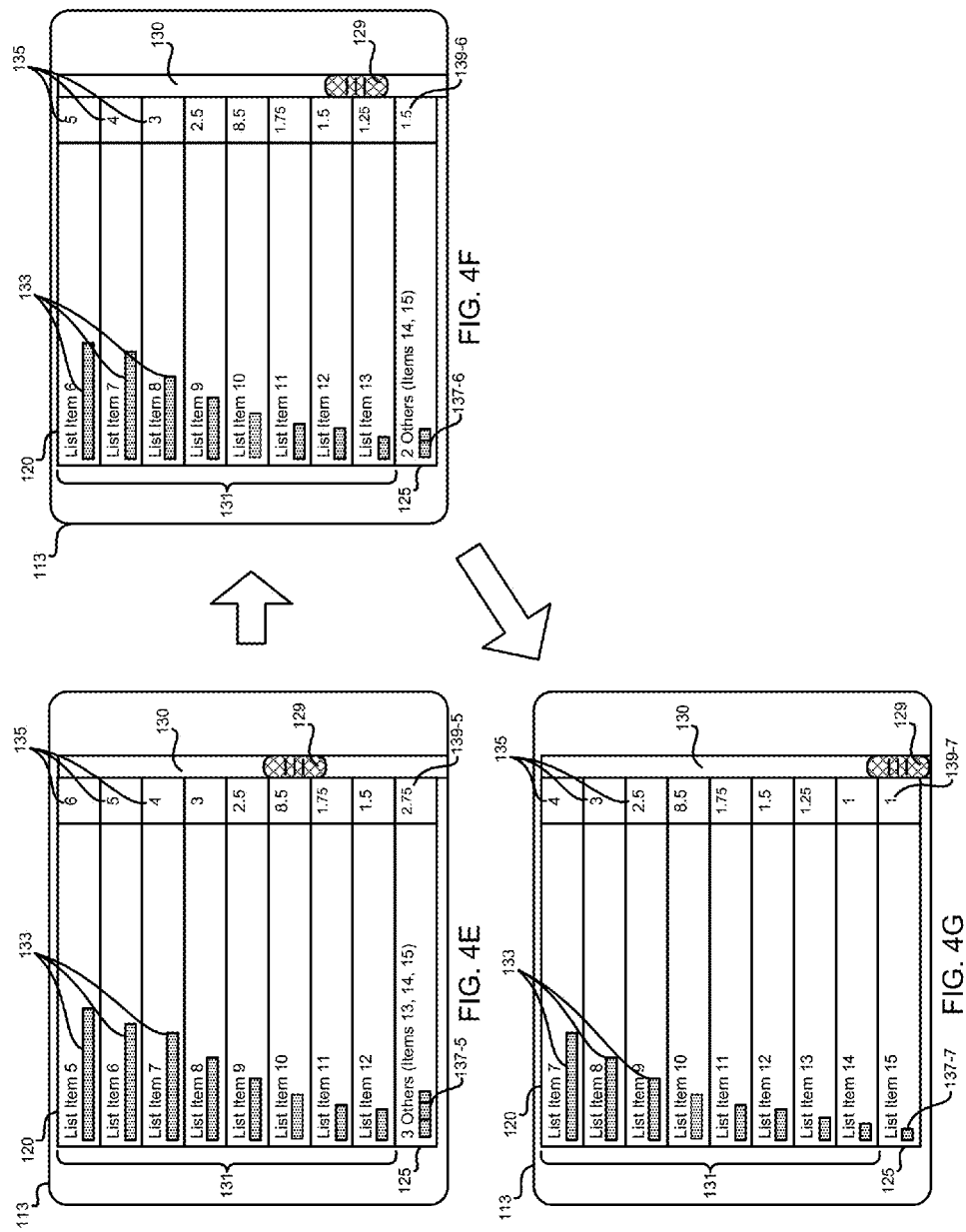

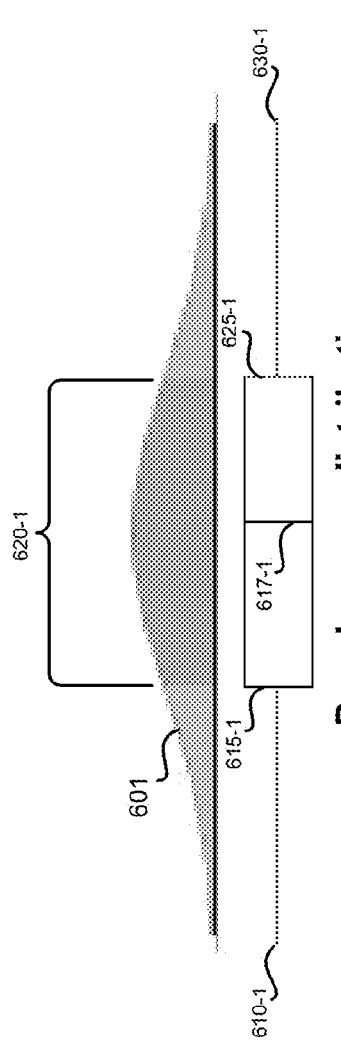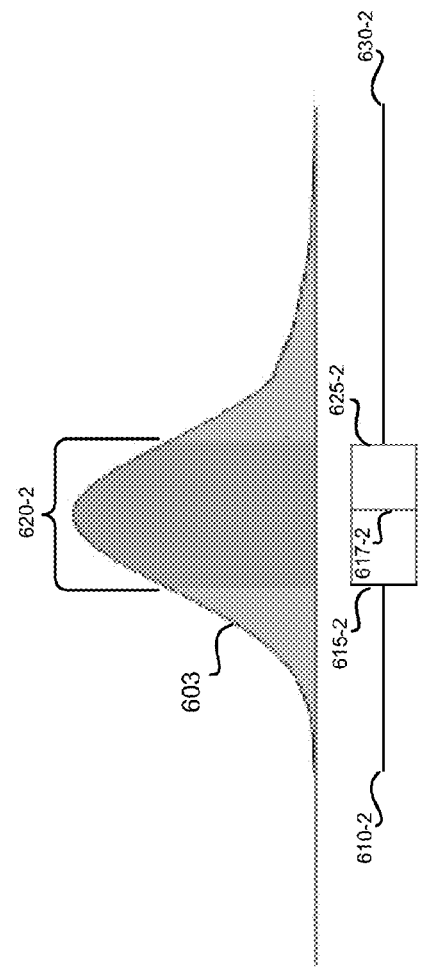

SPACE CONSTRAINED ORDERED LIST PREVIEWS

BACKGROUND

The present disclosure is generally related to computing and information systems, and in particular to systems and methods for analyzing data to provide summaries and previews on space constrained display devices.

Unless otherwise indicated herein, the approaches described in this section are not admitted to be prior art by inclusion in this section.

Computer systems have long been used to gather, retrieve, analyze, and display various types of data. In such systems, everything from raw data to refined visual representations of analytical data are output through various types of output devices to be consumed by users. For example, data can be output on display devices, such as computer monitors, touchscreens, projectors, wearable displays, printers, and the like. To make the such devices and their associated computing devices more portable and energy efficient, many manufacturers are producing smaller sized devices. While there are certain advantages in terms of portability and power consumption in making display devices smaller, the reduction in size inherently imposes constraints on the available area in which to display data.

The size limitations of a display device restrict the type and amount of data that can be legibly displayed at any given time. To adapt to the size limitations, various techniques exist for minimizing the amount of display area required while maximizing the effectiveness of the data. For example, some systems analyze raw data to generate analytical data, such as statistical data, filtered data, and the like. The analytical data can then be summarized and displayed in one or more concise and readily consumable summaries or visualizations (e.g., chart, graph, etc.). Such summaries are often useful for giving quick insight into the data, however, to completely understand the information contained in the data, users often need to delve into the details.

The details are often provided as alphanumeric values for various dimensions and measures of the data set in list form. Due to space limitations and the need for a minimum text size for the information to be legible, only segments of such lists may be displayed on the display device at any given time. To view different segments of the list, users may navigate, by what is known in the field as "scrolling" through the list. Scrolling through the list can offer access to details in the data, but such techniques inherently require that some, if not the majority, of the data in the list be hidden off-screen. Accordingly, displays devices, and other user interfaces, that limit the size of the list segment displayed often occlude the details in and nature of (e.g., distribution of the data in the list) the off-screen list data that might help a user better understand the information contained in the list.

SUMMARY

Embodiments of the present disclosure improve the analysis and processing of list data for the display of information in space constrained display devices. In one embodiment, the present disclosure includes a computer implemented method for analyzing a list to generate a preview or summary of the on-screen and off-screen list items. The method includes retrieving, in response to a request, the list with multiple list items from a data store. The plurality of list items may include one or more values each. The method may also include determining an area in a display device available for displaying the list, determining a first subset of the plurality of list items in response to the area. The first subset of the plurality of list items may contiguous in the list. The method may also include analyzing the list to generate a preview of at least some of the plurality of list items, generating a user interface comprising the first subset of the plurality of list items and the preview, wherein the user interface is sized to fit in the area.

In one embodiment, analyzing the list includes calculating statistical distribution data for the plurality of values. A preview can then be generated that includes a visual representation of the statistical distribution data.

In one embodiment, calculating the statistical distribution data may include calculating a lower quartile value, a median value, and a upper quartile value of the plurality of values, and the visual representation of the statistical distribution data may include a box plot comprising indications of the lower quartile value, the median value, and the upper quartile value.

In one embodiment, the preview may further include an indication of a location of the values in the first subset of the plurality of list items relative to the statistical distribution data.

In one embodiment, the method may further include determining a second subset of the plurality of list items, and calculating a sum of the values in the second subset of the plurality of list items. Generating the preview may include generating a composite row or list item comprising the sum of the values from the second plurality of list items.

The method may also include generating a plurality of visual representations of the values in the plurality of list items, and generating a visual representation of the sum of the values in the second subset of the plurality of list items that includes the visual representation of the values in the second subset of the plurality of list items. In such embodiments, the preview may include the visual representation of the sum.

The method may also include determining a second subset of the plurality of list items, and calculating a mean value of the values in the second subset of the plurality of list items. Generating the preview may include generating a composite row or list item comprising the mean value.

Another embodiment of the present disclosure includes a non-transitory computer readable medium having instructions stored thereon, that when executed by a computer processor cause the computer processor to be configured for retrieving, in response to a request, a list from a data store, wherein the list may include a plurality of list items. The plurality of list items may include a plurality of values. The instruction may further cause the computer processor to be configured for determining an area in a display device available for displaying the list, determining a first subset of the plurality of list items in response to the area, analyzing the list to generate a preview of at least some of the plurality of list items, and generating a user interface of the list comprising the first subset of the plurality of list items and the preview, wherein the user interface is sized to fit in the area. The first subset of the plurality of list items may be contiguous in the list.

Yet another embodiment includes a system comprising a computer processer, and a non-volatile computer readable medium comprising instructions, that when executed by the computer processor, cause the computer processor to be configured to retrieve, in response to a request, a list from a data store, wherein the list comprises a plurality of list items, and wherein the plurality of list items comprises a plurality of values, determine an area in a display device available for displaying the list, determine a first subset of the plurality of list items in response to the area, wherein the first subset of the plurality of list items are contiguous In the list, analyze the list to generate a preview of at least some of the plurality of list items, and generate a user interface of the list comprising the first subset of the plurality of list items and the preview, wherein the user interface is sized to fit in the area.

The following detailed description and accompanying drawings provide a better understanding of the nature and advantages of the present invention.

BRIEF DESCRIPTION OF THE DRAWINGS

FIGS. 3A to 3D illustrate a composite summary row according to one embodiment of the present disclosure.

FIGS. 4A to 4G illustrate scrolling views of list data with summary composite rows of off-screen data according to one embodiment of the present disclosure.

FIGS. 6A and 6B illustrate characteristic statistical data of list data.

DETAILED DESCRIPTION

Figure 1:
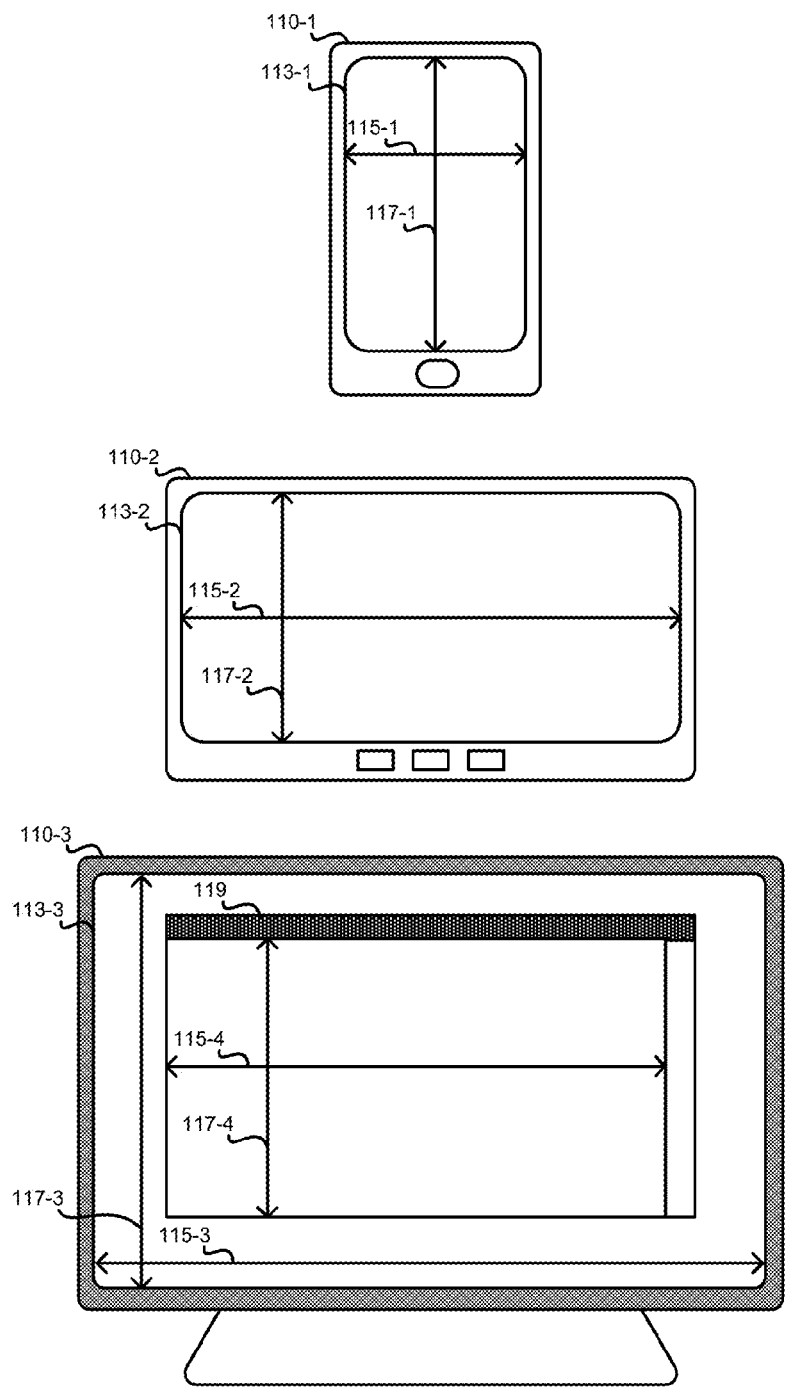
FIG. 1 illustrates various computing and display devices that can be used to implement and be improved by various embodiments of the present disclosure.

Described herein are techniques for systems and methods for generating summary previews of ordered data on space constrained display devices. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Overview

The dimensions and resolution of a particular display device inherently constrains the type and amount of data that can be displayed at a given time. Such constraints are particularly evident in scenarios in which data sets in the form of lists are displayed to users. Often only small portions of a list can be legibly shown at a time. While it is may be possible to scroll through the list, thus making different segments of the list visible, much of the list is inherently hidden. The larger the list is, the larger the percentage of data in the list that is not displayed within the available display area is. Portions of a list that may be in memory, or otherwise readily available, but that are not currently being displayed, are referred to herein as "off-screen" data or list items.

In one embodiment, a data set can be retrieved and/or sorted according one or more categorized values as a list. Categorized values for a particular category or measure of the data are referred to herein generically as values and can include any type of data (e.g., real number, integers, alphanumeric text, hexadecimal data, ASCII code, etc.).

The ordered list can be analyzed and some portion or segment thereof can be displayed in the available display area of a given user interface on a local or remote display device. The user interface or display device can include controls for scrolling through the list to view other segments of the list. Accordingly, the visible segment of the list that can be legibly fit in the available display area can be presented as some number of rows or columns in a table, while the portions of the list that do not fit in the available display area remain off-screen. Scrolling through the list is thus represented as scrolling through the rows and/or columns of the list by replacing visible rows or columns with row or columns that were previously off-screen according to the order of the rows or columns in the list. For the sake simplicity, the term list item is often used herein to refer generically to any entry in a list, be it in row or column form. The list items displayed in the available display area and the off-screen list items can be analyzed in combination or separately to generate one or more previews or summaries of the off-screen list items or the list as a whole.

In one embodiment, all of the values in the list can be analyzed to generate statistical data. Such data can include information that can be used to characterize the distribution of the data. For example, the statistical data can include identification of the values that represent the lowest value in the list, the lower quartile, the mean or average, the upper quartile, the mode, the median, and the largest value in the list. The statistical data can be used to generate a box plot graph. The box plot can then be used as a summary of the list. In one embodiment, the box plot graph can be superimposed on a scroll bar in the user interface to give a visual indication of the nature of the distribution of the values. In another embodiment, the box plot can be scaled according to the dimensions of the scroll bar. In such embodiments, the range of the values displayed in the visible list items can be indicated in relation to the scroll bar box plot by an adaptively sized slider. The slider can be sized and disposed relative to the box plot scroll bar to indicate which portion of the distribution is currently displayed in the available display area.

In another embodiment, the off-screen list items can be analyzed relative to the list items currently displayed in the available display area. Based on the analysis, a preview of the off-screen list items can be displayed in the available display area.

For example, the off-screen list items can be summed. The sum of the values can be compared to the largest value of the list items that are currently displayed. If the sum is less than or equal to the largest value, then sum can be presented as a value in a composite list item or row (e.g., at the end of the list). In some embodiments, the sum can also be displayed as a visual representation (e.g., a bar chart element). If the sum of the off-screen values is greater than the largest value, then the average or mean value of the off-screen values can be presented in the composite list item.

These and other embodiments of the present disclosure are described in more detail below.

Display Devices

FIG. 1 illustrates various types of computing devices 110 that can be used to implement and be improved by various embodiments of the present disclosure. For example, computing devices 110 can include a smartphone 110-1, a tablet computer 110-2, or an all-in-one computer or desktop computer with monitor 110-3. Each computing device 110, in addition to a processor, a memory, a network interface, and other logic components and circuitry, may also include a display device 113 with dimensions 115 and 117 corresponding to the size and/or form factor of the computing device 110. In some embodiments, the display devices 113 can include an CRT display, an LCD display, an LED display, an OLED display, a projection display, a touchscreen display, and the like. The display devices 113, as is depicted in the all-in-one computer 110-3 with display device 113-3, can display another internal display region 119 (e.g., a graphical user interface window, also referred to herein as a "window") having corresponding dimensions 115-4 and 117-4.

The dimensions 115 and 117 can impose space constraints on the amount and type of data that can be displayed on a given display device 113 or window 119. In addition, the resolution of the display devices 113 (i.e., the number of pixels in each dimension 115 and 117) can also impose restrictions on the amount of data that can be legibly displayed in the available display area. As used herein, the term "available display area" is used to refer to the area of any display device 113 or window 119 available for displaying data given the corresponding dimensional and resolution constraints. Additionally, the available display area may refer to the display area that is not being used to render other items (e.g., user controls, graphics, titles, etc.) in a particular graphical user interface (GUI).

Figure 2:
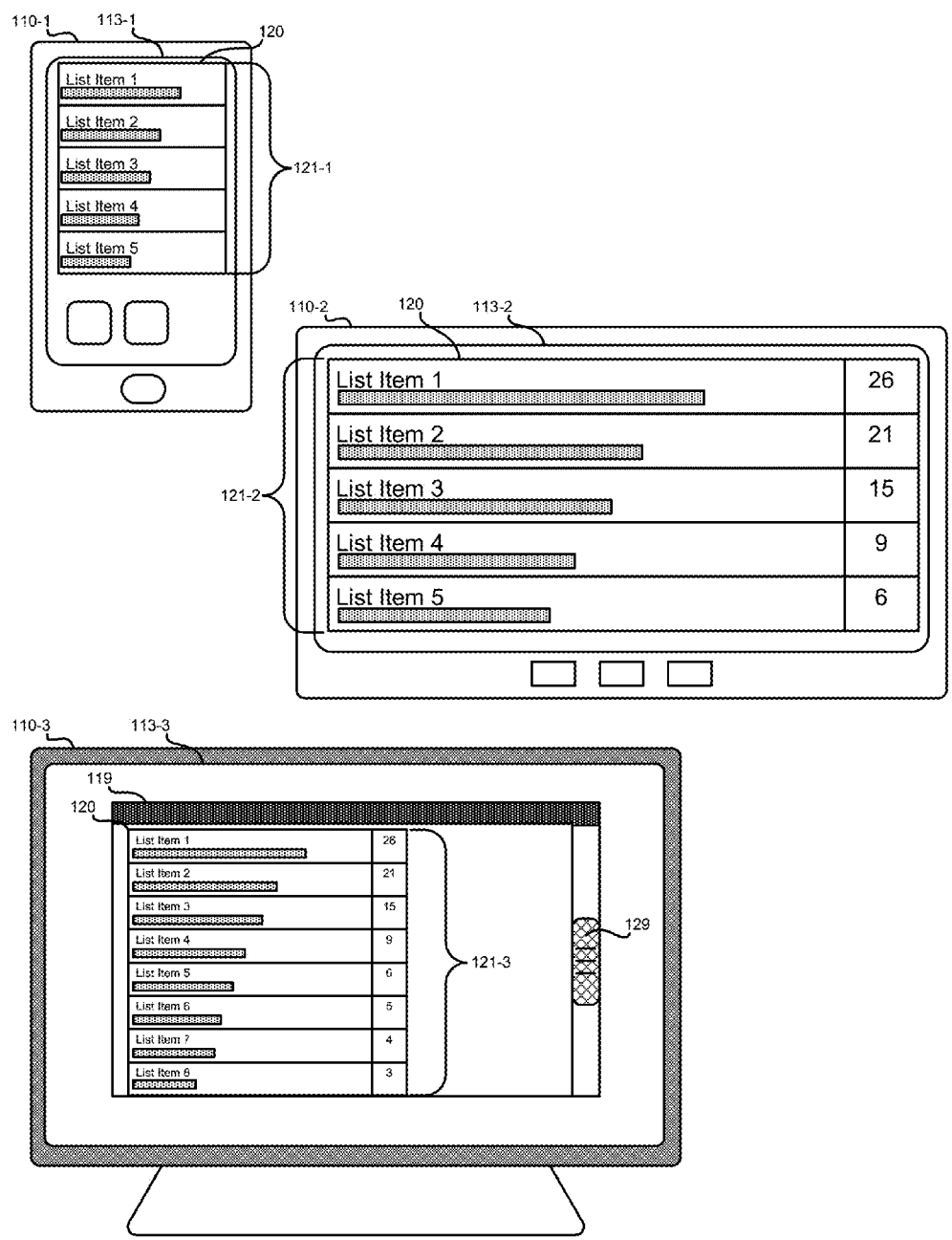
FIG. 2 illustrates list views of data that can be improved by various embodiments of the present disclosure.

FIG. 2 illustrates contiguous segments 121 of an list 120 that can be displayed based on the constraints imposed by the corresponding dimensions 115 and 117 and the resolution of each of the example display devices 113. For example computing device 110-1 can display a segment 121-1, computing device 110-2 can display a segment 121-2, and the computing device 110-3 can display segment 121-3 in window 119. In one embodiment, the list 120 is an list ordered according to one or more values in the list items.

As illustrated, each of the segments 121 of the list 120 may include different numbers of rows and columns, as well as differently sized alphanumeric text and corresponding visualizations of corresponding values. For example, the segment 121-1 is rendered with only a single column, while the segment 121-2 rendered with two columns. Furthermore, the segment 121-3 is depicted having eight list items of the list 120, while segments 121-1 and 121-2 each only have five list items.

To view more or different sections of the list 120, users may navigate through the list 120 by scrolling up or down or left and right to different sections of the list 120. In the case of the smart phone 110-1 and the tablet computer 110-2, the user may navigate to different sections of list 120 by operating or interacting with display devices 113-1 and 113-2 (e.g., touchscreens) using finger or stylus gestures. In the case of an all-in-one or desktop computer 110-3, a user may navigate to different sections of list 120 by operating the rendered control 129 using a mouse or other pointing device, or in embodiments in which the all-in-one computing device 110-3 includes a touchscreen monitor as the display device 113-3, a user may navigate using finger or stylus gestures.

Composite Row Previews

FIG. 3A illustrates example segments 121 and 123 of the list 120 that can be displayed within the available display area of display device 113. In the example, list 120 includes fifteen list items. As shown, display device 113 can display nine of the fifteen line items in the segment 121 of list 120 based on the corresponding size and resolution constraints or settings. To navigate to some or all of the list items in segment 123, a user may operate the slider 129 of the scrollbar 130 to scroll to different segments of the list 120. However, viewing only a limited segment of the data in the list 120 may not be desirable or optimal for consuming the data.

Figure 3B:
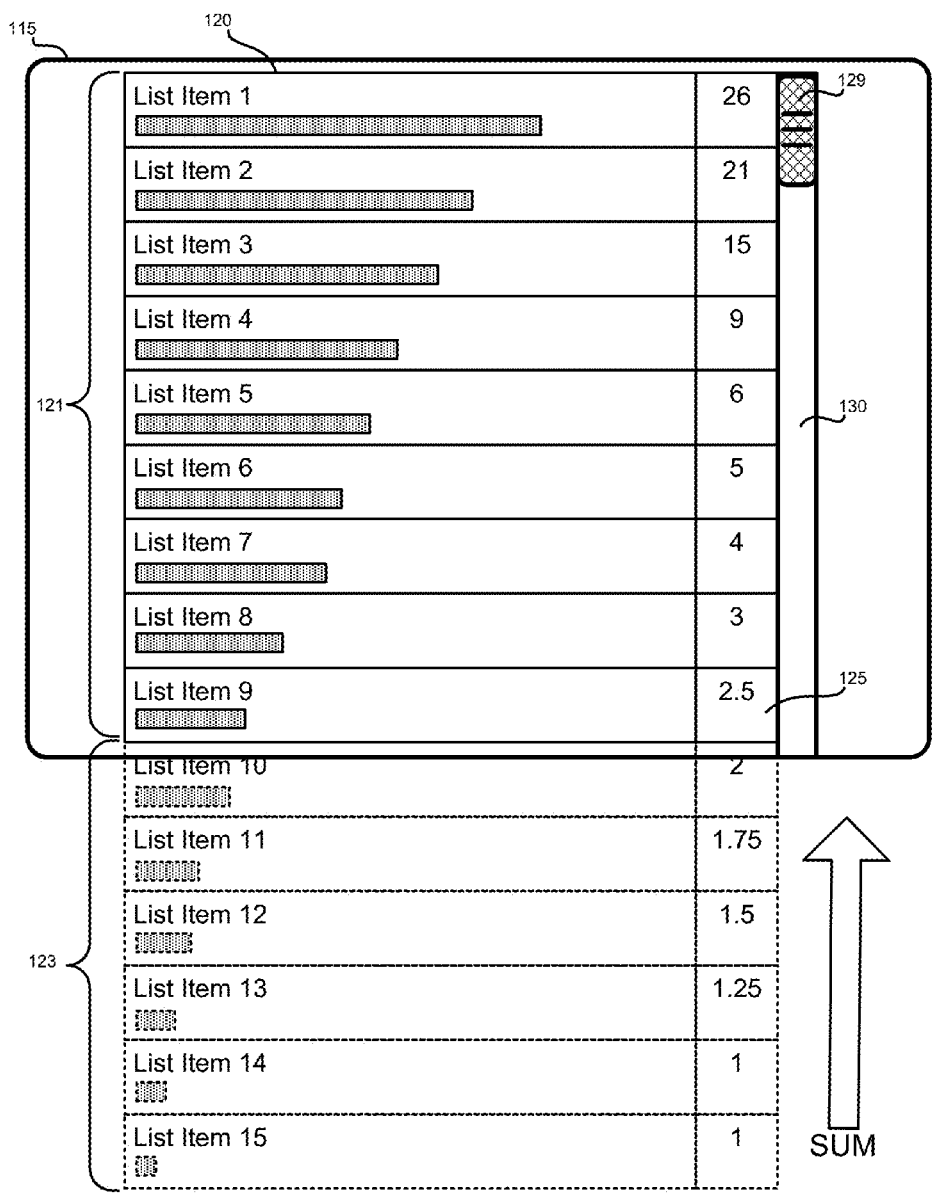
Figure 3C:
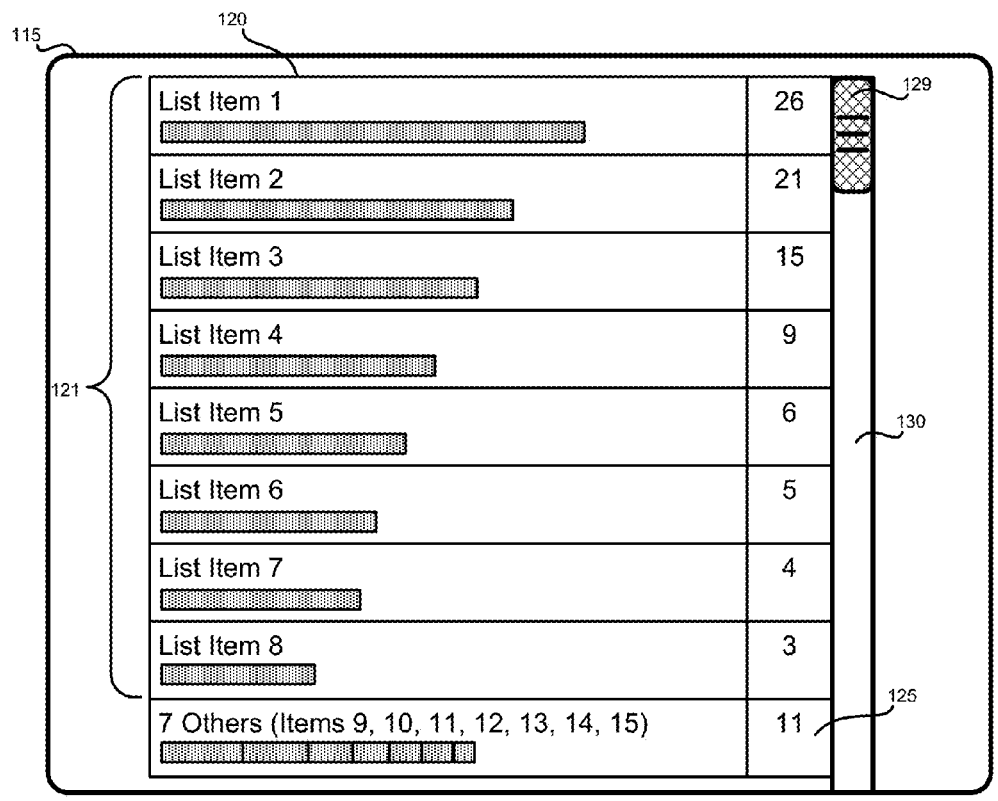

As illustrated in FIG. 3B, the list items in the segment 123 of the list 120 can be combined or summed into the composite list item 125 of the list segment 121. Accordingly, in FIG. 3C the values and other data from list items 9 through 15 can be included in a single row 125 below visible rows 121 of the list 120. In the particular example shown, the composite row 125 combines the values and/or any visual representations from list items 9 through 15 and/or a summary that indicates there are seven additional items not being shown in individual lines. Composite row 125 with the sum of the off-screen values is referred to herein as a summed composite row type preview. While the composite row 125 is shown disposed at the bottom of the segment 121, other embodiments are possible in which the composite row 125 is disposed in other locations relative to the segment 121.

Figure 3D:
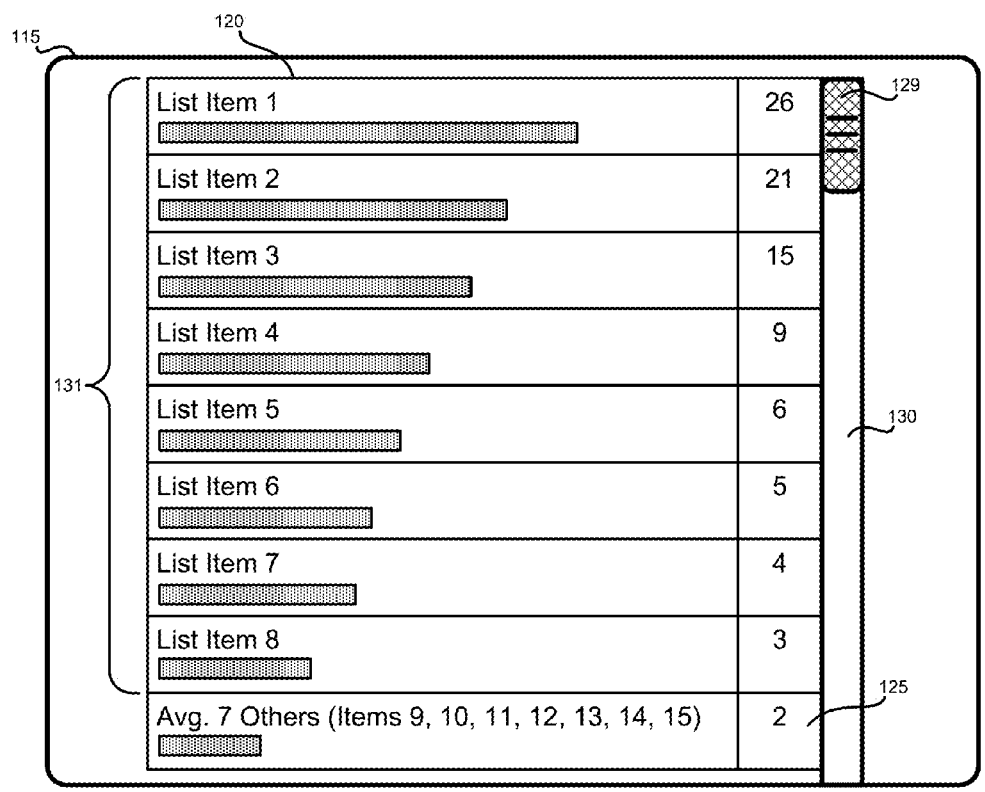

FIG. 3D illustrates another embodiment of the present disclosure in which composite row 125 includes an average value of the seven other list items (items 9 through 15) and a corresponding visual representation of the average value. In such embodiments, values in the list items of the segment 123 may be combined or averaged to indicate to a user that more data is available than is currently shown in the visible rows 121 and some indication of the nature of that data (e.g., the average value, the median value, the mode, the smallest value, etc.). Composite row 125 with the average or other statistical value of the off-screen values is referred to herein as an average or statistical composite row type preview.

FIGS. 4A through 4G illustrate how a computing device 110 can render and display a composite row type preview of a list 120 on a display device 113 with limited available display area, according to various embodiments of the present disclosure. A list 120 can include a number of list items that represent data retrieved from or are derived from raw data stored locally on computing device 110 or remotely on a server computer or in a cloud computing environment. The list items may be in the form of rows in a table, each with at least one column of values or a visual representation of the values. In some embodiments, it is useful to include a description or units for the values in the list items in the table 120. The computing device can analyze and/or organize the list items according to the values in one or more of the columns.

In the particular example shown in FIGS. 4A-4G, each visible row may include a name/description (e.g., "List Item XX"), a corresponding numerical value 135, and a visual representation 133. The visual representations 133 may include bar graph elements having a dimension (e.g., a size or length) that correspond to the magnitude of the corresponding numerical values 135. While bar graph elements are used to illustrate various aspects of the present disclosure in FIGS. 4A through 4G, one of ordinary skill will realize that other embodiments of the present disclosure may include other types of visual representations 133, including but not limited to, pie chart elements, bubble graph elements, icon ratings, tallies, and the like.

As discussed above, the computing device 110 can render and display each visible row 131 in the list 120 as a list item having a number of values 135 for various measures in the raw data, as well as visual representations 133 of the values. In the particular example illustrated in FIGS. 4A through 4G, the visible rows 131 can include values for specific measures in a segment of list 120 and a composite list item 125 as a user scrolls through the list items. The composite list item 125 may include a summary or preview of the list items of the list 120 that do not fit in the available display area of the display device 113. In general the off-screen list items do not fit in the available display area.

Off-screen list items may be conceptualized as being above, below, and/or beside list items within the visible rows 131. To help users better understand the nature of the data in the off-screen list items, the off-screen list items can be summarized or previewed as composite values 139 and/or composite visual representations 137 in the composite list item 125. The composite values 139 may include values calculated from the off-screen list items, such as the sum of the values, or an average or other statistical value, and the like. Similarly, the composite visual representations 137 may represent a compilation of the visual representation 133 of the corresponding values 135 in the off-screen list items. In the particular example shown, the visual representations 133 include bar chart elements that include bars sized to visually represent the corresponding values 135.

FIG. 4A illustrates the list 120 as rendered in FIG. 3D with visible rows 131 above a composite row 125-1 that includes or combines data from seven off-screen list items (i.e., list items 9 through 15) that are not individually viewable within the available display area of the display device 113. FIGS. 4B through 4G illustrate the changes to the visible rows 131 and composite row 125 in response to user input that indicates scrolling through the list 120 by shifting one line down. While the example shown in FIGS. 4A through 4G is depicted with a slider 129 and the scrollbar 130 for navigating/scrolling through the list 120, various embodiments can be implemented by scrolling through the list 120 using finger gestures or stylus motions on a display device 113 that includes a touchscreen or other touch sensitive device.

In FIG. 4B the computing device 110, in response to user input, renders and displays the visible rows 131 including list items 2 through 9. List item 9 is extracted from the composite row 125-1. Accordingly, the composite row 125-2 in FIG. 4B shows that six off-screen list items are available (i.e. items 10 through 15) and includes a value 139-2 corresponding to the sum of the values in those off-screen list items. The composite visual representation 137-2 thus represents the value 139-2.

FIGS. 4C through 4G illustrate how the computing device 110 renders and displays the composite row 125 preview of the list 120 in response to user input that indicates scrolling further through the list 120. When the list 120 scrolls, list items disappear from the top of the visible rows 131 (e.g., scroll off from the available display area) and list items are extracted and deleted from the composite row 125.

In FIG. 4C, the computing device 110, in response to user input, scrolls the list 120 up so that list items 1 and 2 are not shown in the available display area of the display device 113 and list items 3 through 10 are shown in the visible rows 131. Off-screen list items 11 through 15 are included in the composite row 125. The composite visual representation 137-3 includes visual representations of the sum 139-3.

Next, in FIG. 4D the computing device 110, in response to user input, scrolls the list 120 up so that list items 1 through 3 are not shown in the available display area of the display device 113 and list items 4 through 11 are shown in the visible rows 131. Off-screen list items 12 through 15 are included in the composite row 125. The composite visual representation 137-4 includes visual representations of the sum 139-4.

In FIG. 4E the computing device 110, in response to user input, scrolls the list 120 up so that list items 1 through 4 are not shown in the available display area of the display device 113 and list items 5 through 12 are shown in the visible rows 131. Off-screen list items 13 through 15 are included in the composite row 125. The composite visual representation 137-5 includes visual representations of the sum 139-5.

In FIG. 4F the computing device 110, in response to user input, scrolls the list 120 up so that list items 1 through 5 are not shown in the available display area of the display device 113 and list items 6 through 13 are shown in the visible rows 131. Off-screen list items 14 and 15 are included in the composite row 125. The composite visual representation 137-6 includes visual representations of the sum 139-6.

Finally, in FIG. 4G, the computing device 110, in response to user input, scrolls the list 120 up so that list items 1 through 6 are not shown in the available display area of the display device 113 and list items 7 through 14 are shown in the visible rows 131. Off-screen list item 15 is included in the composite row 125. The composite visual representation 137-7 includes visual representations of the sum 139-7 (i.e., the value of list item 15).

As used herein, the term "user input" is used to refer to any input from a user, an application, or computer system. Accordingly, the user input can include command messages or signals, or other triggers, received from an application or computer external or internal to the display device 113 and/or computing device 110. For example, a user interface implemented in one application or web browser may receive a message from another application that there has been an update to the contents of the list 120 (e.g., a new list item has been added to the list). In response to the message, the computing device 110 can render and display the update by scrolling the list 120 up or down in the available display area of the display device 113 (e.g., scroll to location of the new list item).

As the list 120 scrolls up, list items are extracted from the composite row 125 and depicted as an individual visible row 131 that takes up a row slot freed up by scrolling the top rows out of view. Ultimately, the last list item at the bottom of the list 120 is reached and included on its own in the composite row 125. This process can be reversed as the list 120 is scrolled down. Values and visual representations of the values of list items that fall out of the visible rows 131 are added back into the composite row 125.

In some embodiments, the computing device 110 can dynamically compare the sum of the values of the off-screen list items included in the composite row 125 with the largest of the values 135 and visual representations 133 in the list 120 or the list items in the visible rows 131. Based on the comparison, the computing device 110 can determine to render and display the composite row 125 with a value 135 and/or visual representation of the value 137 that represents the sum or average of the off-screen list items.

In one embodiment, the computing device 110 can calculate the sum of the values in the off-screen list items and compare it to the largest of the values 135 of the list items in the list 120 or visible rows 131. If the sum of the values in the off-screen list items is greater than the largest value, then the computing device 110 can determine to display the preview of the off-screen list items as a value that represents the average the composite row 125. The composite row 125 can also include a visual representation corresponding to the average value of the off-screen list items. The average value of the off-screen list items can be calculated as the sum of the values in the off-screen list items divided by the number of off-screen list items. However, if the sum of the values in the off-screen list items is equal to or less than the largest of the values 135 in the list 120 or visible rows 131, then the computing device 110 can determine to display the sum of the values in the off-screen list items in the composite row 125.

Box Plot Scroll Bar Previews

Figure 5:
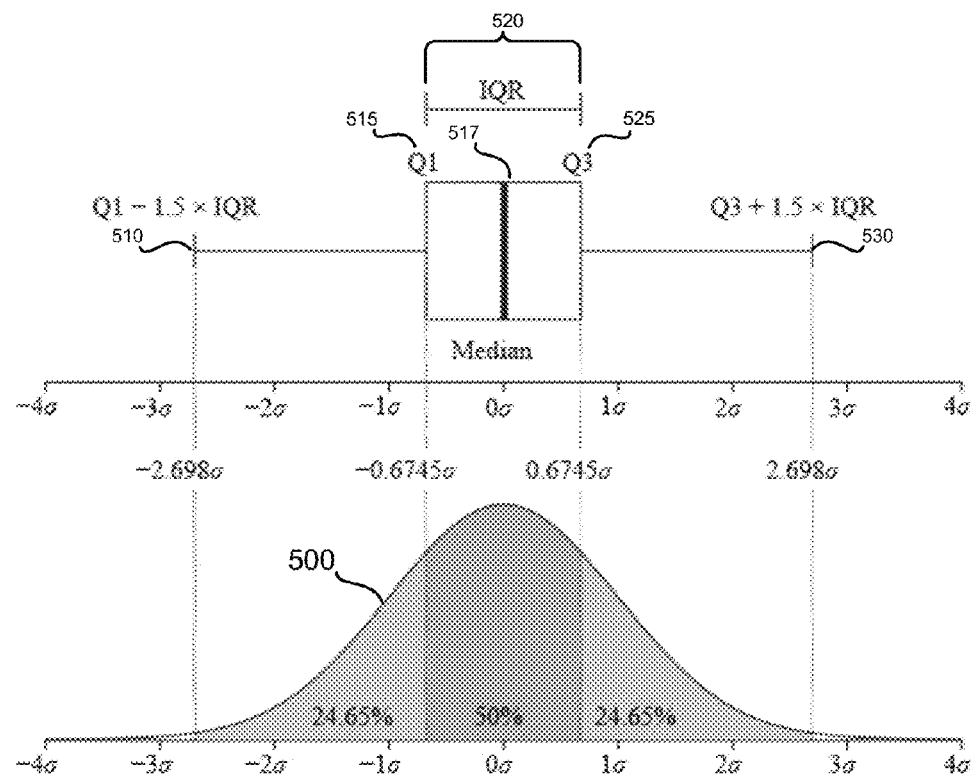
FIG. 5 illustrates characteristic distribution data of list data.

In other embodiments, the computing device 120 can show other types of summaries in addition or as alternatives to the information shown in the preview of list 120 that includes the composite row 125 illustrated in FIGS. 3A through 3D and FIGS. 4A through 4G. For example, the computing device can retrieve and analyze the list data and include the results of the analysis in the preview. Part of the analysis that the computing device 110 can perform on the list data may include calculating statistical data. The statistical data can include values that describe the distribution of the values in the list data. For example, as illustrated in FIG. 5, the computing device 110 may analyze the list data and calculate the standard deviation of the list data, the minimum value 510, the values of the lower quartile 515, median 517, the upper quartile 525, and the maximum value 530 of the distribution 500 of the list data. In addition, the computing device 110 can determine the range or width between the lower quartile value 515 and the upper quartile value 525. The statistical data show in FIG. 5 determined by the computing device 110 will, of course, vary based on the distribution of the list data.

FIGS. 6A and 6B illustrate how the statistical data varies based on the distribution of the values in the list data. In particular, FIG. 6A depicts the statistics having a broad and even distribution 601 of values in the list data. As with the distribution 500 illustrated in FIG. 5, the computing device 110 can calculate or otherwise determine the minimum value 610-1, the lower quartile 615-1, the median 617-1, the upper quartile 625-1, and the maximum value 630-1 of the list data. Due to the broad and even distribution 601 of the list data, the range 620-1 between the lower quartile value 615-1 in the upper quartile value 625-1 is relatively wide. In contrast, FIG. 6B depicts the statistics of list data having a narrow and skewed distribution 603. The computing device 110 can calculate, or otherwise determine, the lowest value 610-2, the lower quartile 615-2, the median 617-2, the upper quartile 625-2, and the maximum value 630-2. Due to the narrow and skewed distribution 603, the range 620-2 between the lower quartile 615-2 in the upper quartile 625-2 is relatively narrow.

The information in the statistical or distribution data of a particular set of data is a useful preview of the character of the data. Accordingly, the statistical data may be used to generate a box plot visualization to map the distribution of quantitatively ordered list items. In some embodiments, the quantitatively ordered list items can be visualized according to quartiles (i.e. 25% increments) of a chosen or predetermined measure in the list data.

In descriptive statistics, a box plot, also known as a box-and-whisker diagram or plot, is a convenient way of graphically depicting groups of numerical data through their five number summaries. The five number summaries may include the smallest observation (e.g., the minimum value of the sample group), the lower quartile (Q1), the median (Q2), the upper quartile (Q3), and the largest observation (e.g., the maximum value of the sample group). A box plot may also indicate which observed values, if any, may be considered outliers in the distribution.

Figure 7:
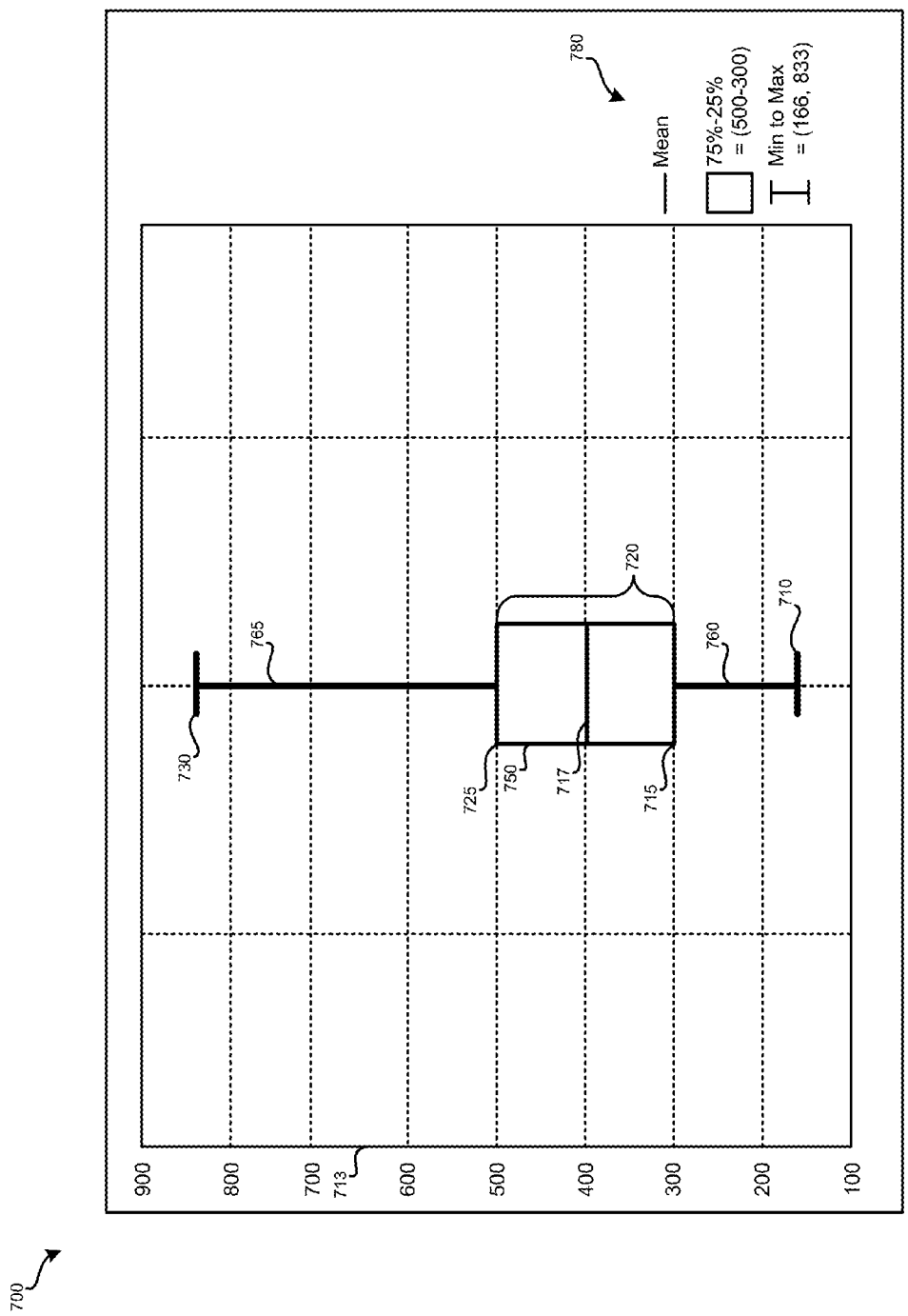
FIG. 7 illustrates a box plot of summary statistical data.

FIG. 7 illustrates an example box plot 700 for an arbitrary set of data with values for a particular measure ranging from 100 to 900 with a particular distribution. Typically, in a box plot 700 the set of data is ordered from largest to smallest, or vice versa, according to the values of a particular measure. The computing device 110 can then divide the list into quartiles according to the distribution. The quartiles can be indicated on the scale 713 with corresponding values of the list items at the lower quartile 715, the median 717, and the upper quartile 725. The range 720 between the lower quartile 715 and the upper quartile 725 are displayed as a box 750. A box 750 may be divided by a line, indicating the middle quartile, which is also referred to herein as the median value 717, of the values in the list data. The so-called "whiskers" of the box plot are represented by the line 760 that connects the lower quartile value 715 to value of the smallest observation 710 and the line 765 that connects the upper quartile 725 to the largest observation value 730. In this particular example shown, the unitless values of the data set are characterized in the legend 780. As shown, the median value is 400, the range 720 between the lower quartile and the upper quartile is a difference between 500 and 300 (i.e., 200), the maximum value 730 is 833, while the minimum value 710 is 166.

Box plots, such as the box plot 700 depicted in FIG. 7 display the differences between data sets without making any assumptions about the underlying statistical distribution. Accordingly box plots are nonparametric. The spacing between the different parts of the box 750 indicate the degree of dispersion or spread and the degree to which the data is skewed. While the example box plot 700 is depicted as a vertical plot, a box plot may be oriented at any angle (e.g., horizontal).

Box plots provide a quick way of examining one or more sets of data graphically. While box plots are more simplistic than a histogram or kernel density estimate, box plots offer various advantages over other types of graph representation of statistical data. In particular, and of particular utility to the present disclosure, box plots take up less available display area the therefore are useful for comparing distributions of several groups or sets of data. In various embodiments of the present disclosure, the preview or summary view of a particular set of data can be depicted as a box plot scrollbar which incorporates elements of a box 750 into the scrollbar 130 of a list 120 displayed on a constrained display device 113.

Figure 8A:
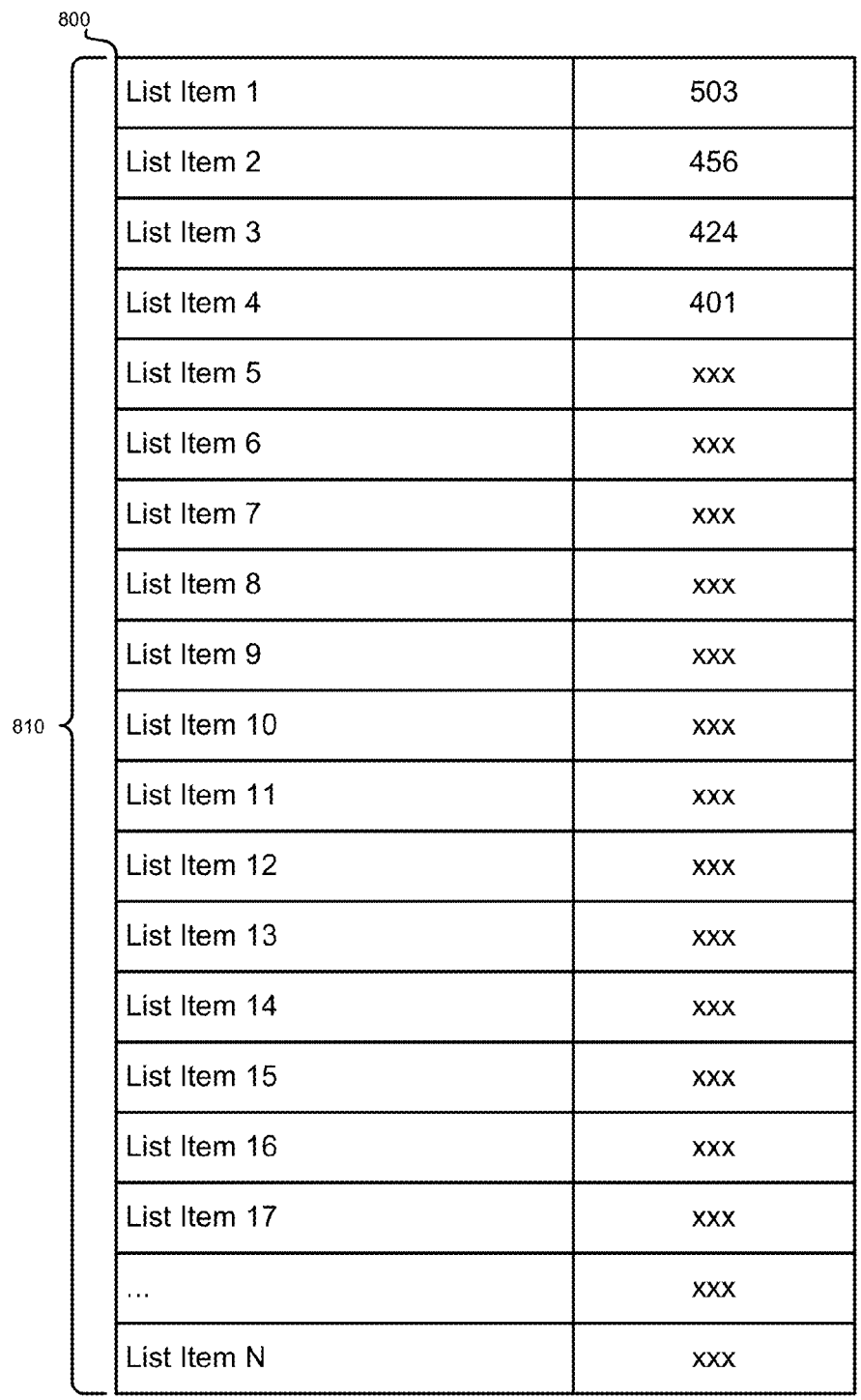
FIGS. 8A to 8C illustrate a box plot scroll bar according to one embodiment of the present disclosure.
Figure 8B:
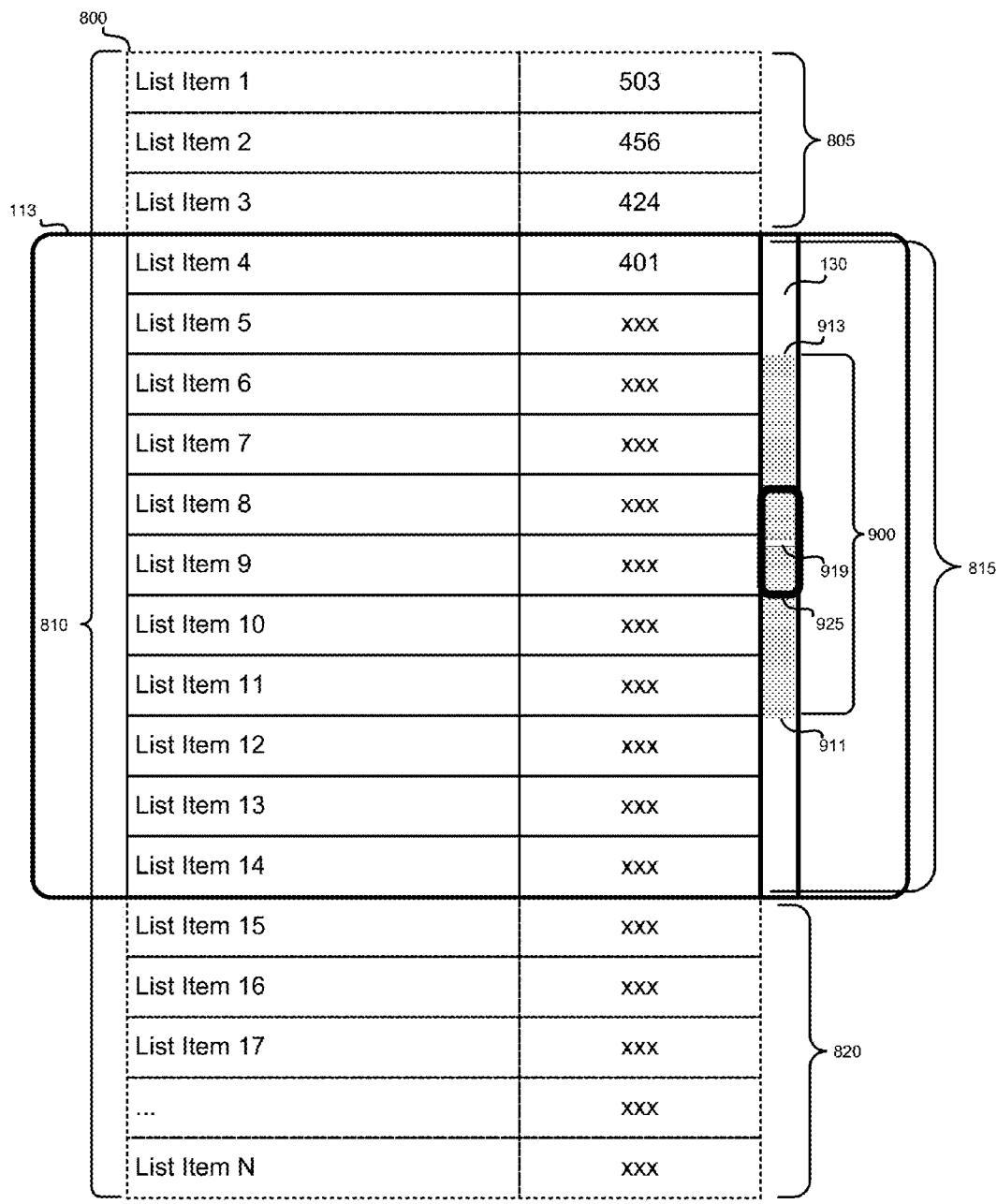
Figure 8C:
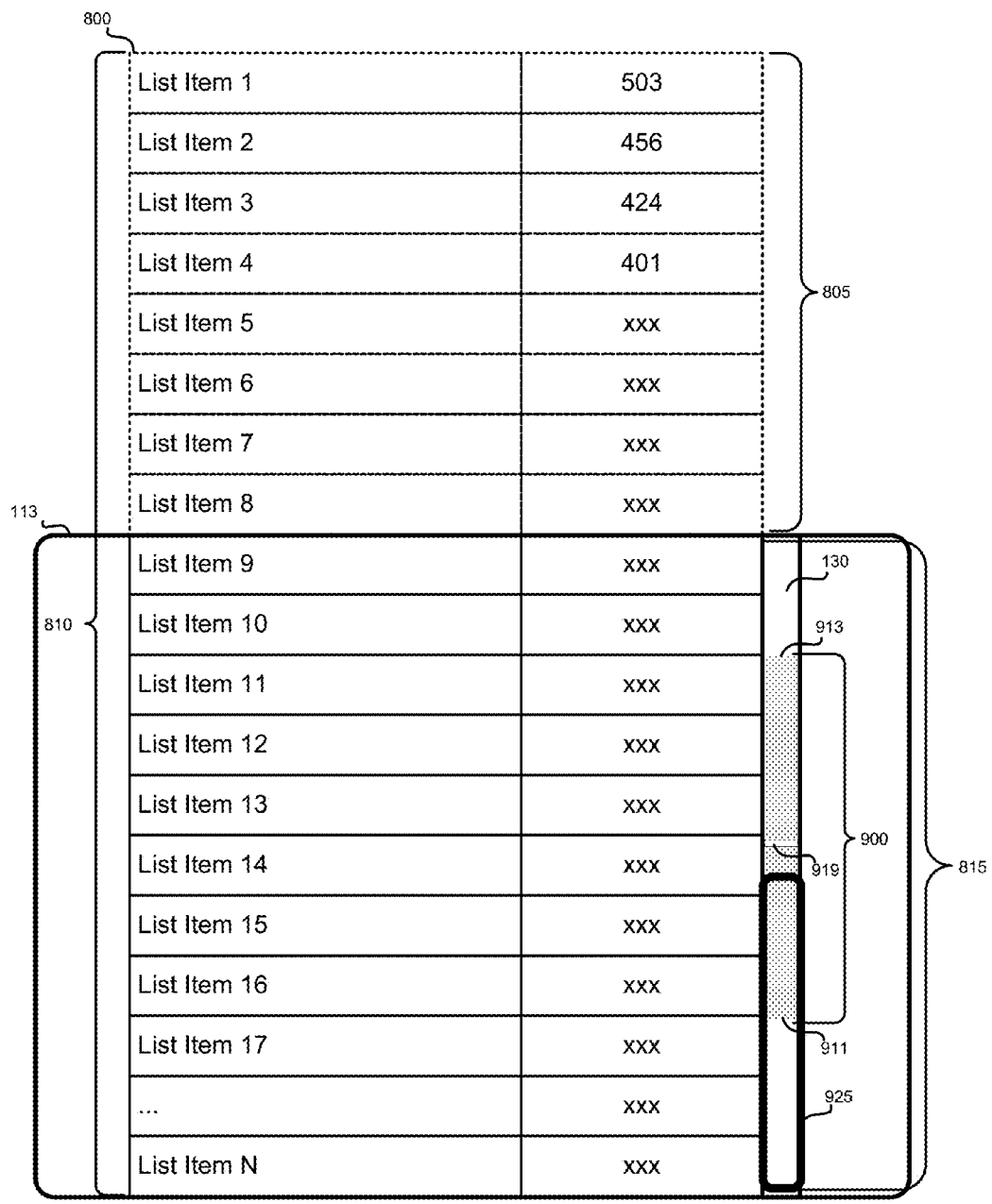

FIGS. 8A through 8C illustrate how the box plot can be superimposed into a scrollbar for navigating through a particular list of list items to provide a preview or summary of the values in the list. FIG. 8A depicts a list 800 having N list items (where N is a natural number) 810. The list 800 can include any number of columns of values. In the particular example shown the list 800 includes two columns. The first column includes a list item description, name, or identifier and a second column that includes values of measures associated with the first column. Each column pair in a row is referred to as a list item 810.

FIG. 8B illustrates how the N list items in the list 800 can only be partially displayed in the available display area of the display device 113. Specifically, only the rows of the list 800 in segment 815 may be visible in the available display area of the display device 113 at any given time. Consequently, the top-most list items 810 in segment 805 and the bottom-most list items 810 in segment 820 are not visible, as depicted by the dotted lines around those list items. The computing device 110 may analyze the values in the list 800 to calculate, or otherwise determine, the statistical data required by for box plot. As discussed herein, to generate a box plot, the computing device 110, or a remote computing device, may calculate the lowest value, the lower quartile value, the median value, the upper quartile value, the maximum value, and other characteristics of the distribution of the values in the list 800. Using this information, the computing device 110 may render and display a scrollbar box plot 900 in the scrollbar 130 in an associated display device 113.

To generate the scrollbar box plot 900, a computing system 110 may normalize the data based on one or more dimensions (e.g., the length) of the scrollbar 130. When the slider 925 is disposed at the top-most position of the scroll bar 130, the list item 810 with the maximum value will be displayed in the visible rows 815, and when the slider 925 is disposed at the bottom-most position of the scrollbar 130, the list item 810 minimum value will be displayed in the visible rows 815. As such, the scrollbar 130 can be scaled between the location of the list items 810 with the maximum value and the minimum value of the values in the list 800.

Once the scrollbar 130 is scaled and the box plot normalized according to that scale, the computing device 110 can superimpose the scrollbar box plot 900 onto or near the scrollbar 130. In some embodiments, superimposing the scrollbar box plot 900 can include rendering and displaying indications 911 and 913 indicating the regions in the scrollbar 130 the slider 925 would need to be placed to show the list items 810 that include the lower and upper quartile values in the visible rows 815. Similarly, the computing device 110 can generate an indication 919 indicating where in the scrollbar 130 in the slider would need to be located to include the list items 810 that include the median value in the visible rows 815.

In some embodiments, the size of the slider 920 can correspond to the range of the distribution represented by the scrollbar box plot 900 that is displayed in the visible rows 815. FIG. 8C illustrates how the size of the slider 925 increases as it moves to show list items 810 with more sparsely populated values in the distribution represented by the box plot 900. Similarly, although not shown, the size of the slider 925 may decrease as it moves to show list items 810 with more densely populated values in the distribution represented by the box plot 900. Accordingly, the size of the slider 925 can indicate which slice of the distribution of values in the list 810 is currently being displayed in the available display area of display device 113. The adaptive sizing of the slider 925 advantageously indicates what part of the distribution of data is being shown in the visible rows 815. Accordingly, the slider 925 may be referred to herein as an adaptively sized slider.

Figure 9:
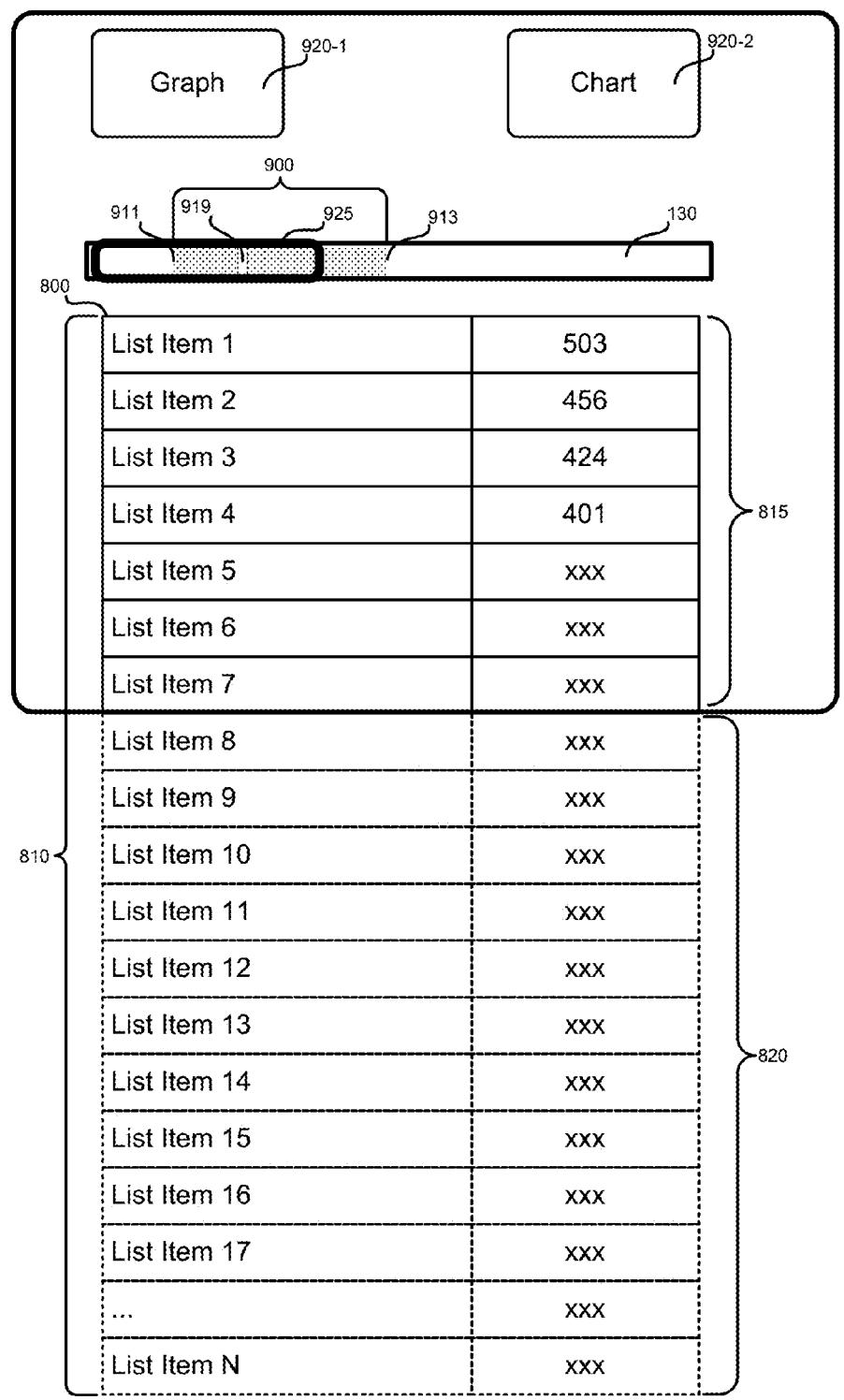
FIG. 9 illustrates a box plot scroll bar according to one embodiment of the present disclosure.

FIG. 9 illustrates another embodiment of the present disclosure in which the visible rows 815 a list 800 may be displayed in the available display area of a display device 113. In this particular example, the scrollbar 130 is depicted horizontally. Accordingly, the slider 925 and the box plot 900 may also be rendered and displayed horizontally. As shown, the visible rows 815 are constrained not only by the dimensions of the display device 113, but also by limitations on the available display area imposed by other controls or graphics 920 that are rendered in display device 113 concurrently with the list 800.

Preview Generation System

Figure 10:
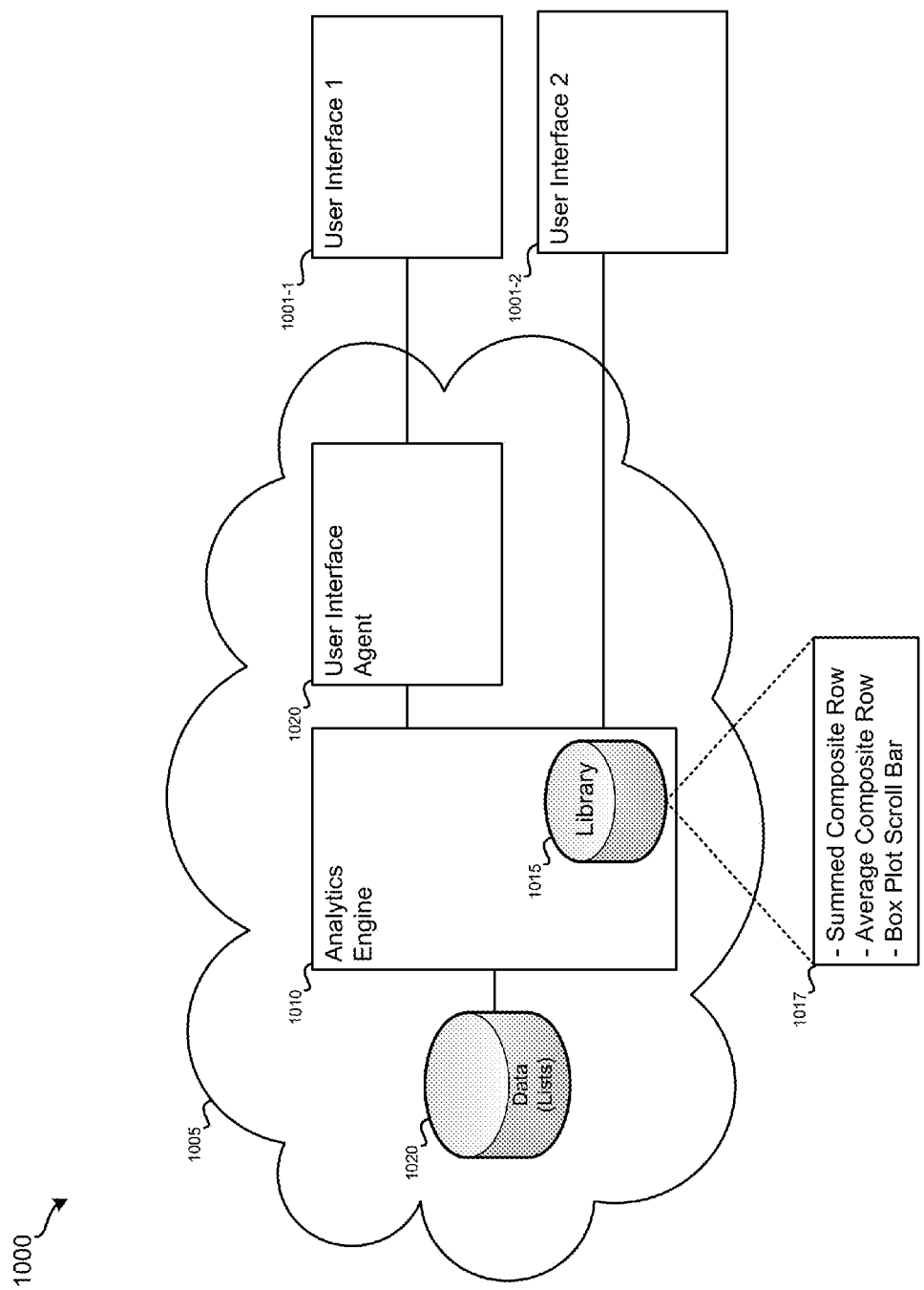
FIG. 10 illustrates system for generating summary previews according to embodiments of the present disclosure.

FIG. 10 is a schematic diagram of a system 1000 according to various embodiments of the present disclosure. The network topology of system 1000 assumes a server-client configuration, in which data stored in the data store 1020 is retrieved and displayed in user interfaces 1001 rendered and displayed in remote computing devices 110. In such embodiments, much if not all of the data and analytical functionality can be implemented as a combination of software, firmware, and hardware in one or more computer systems in a cloud computing environment 1005. For example, an analytics engine 110 may be coupled to data store 1020. In response to commands or control signals received from individual user interfaces 1001, the analytics engine 1010 can retrieve data from the data store 1020. In some embodiments, the data store 1020 may include raw data and compiled or ordered list data. The raw data may include information accessed by other systems or programs in their native proprietary or standardized file format. Compiled list data may include information that has been refined or organized into a list of values of a particular dimension or measure of interest or relevant to particular user task.

The analytics engine may include an analytics library 1015. The analytics 1015 may include a number of analytic definitions 1017 that include instructions for performing different types of analysis on the data retrieved from the data store 1020 to generate different types of summaries or previews described herein. In one embodiment, the library 1015 may include analytic definitions 1017 associated with specific available display areas, computing devices, display devices, or users that the analytics engine 1010 can use to analyze the values in the list data and to generate a preview or summary of the values in the list.

The analytic definitions 1017 may include instructions for generating one or more types of previews of the data. Each one of the analytic definitions 1017 may be associated with a particular type of preview described herein. Additionally, each one of the analytic definitions 1017 maybe associated with a particular type of display device 113 or computing device 110. Furthermore, users may customize analytic definitions 1017 according to individual needs or preferences and associate the custom analytic definitions 1017 with a corresponding user identifier. Accordingly, the analytics engine may retrieve a specific analytic definition 1017 based the information about the user, the display device 113, the computing device 110, or specific settings received in a request from a user interface 1001.

The analytic definitions 1017 may include instructions that cause the analytic engine 1010 to generate previews that include raw and/or processed data from the list data retrieved from the data store 1020. For example, the preview may include actual values from some segment of list data and/or visual representations of that data that fit in the available display area of a particular user interface 1001. In addition, the preview may also include information about list data that cannot be fit into the available display area. As described herein, the preview may include composite rows with indications of the sum of the values in the off-screen list items and/or visual representations thereof. Alternatively, the previews may include composite rows that includes statistical data, such as the average, the median, the mode, or the like, about the values in the off-screen list items. In one embodiment, the preview may also include a box plot superimposed into the scrollbar with an adaptively sized slider corresponding to the range of the values visible in the available display area in relation to the distribution represented in the box plot. In another embodiment, the preview may include the adaptively sized slider be superimposed on the scroll bar without the box plot, and sized according to the range of the values visible in the available display area in relation to the distribution (e.g., just the adaptively sized slider without the box plot superimposed in the scroll bar).

The analytics engine 1010 may receive a request for a particular set of data from a user interface 1001. In some embodiments, the analytics engine 1010 can receive the requests from user interface 1001 directly, as illustrated by the connection between the analytics engine 1010 and the user interface 1001-2. In such embodiments, the user interface 1001-2 may be rendered on a computing device 110 executing a client application that can communicate directly with the analytics engine 1010. The client application may include functionality for receiving input from a user or another application, generating a request based on the input, and transmitting the request to the analytics engine 1010. Alternatively, the analytics engine 1010 can receive requests from the user interface 1001-1 through a user interface agent 1020. In such embodiments, the user interface agent 1020 may include the logic and other functionality for generating and rendering the user interface 1001-1 displayed in a display device 113 in a remote computing device 110. The rendered user interface 1001-1 may then be transmitted to one or more remote computing devices 110 to be displayed on the corresponding display device 113.

The user interface agent 1020 or a client application executed on the computing device 110, may include all of the state information about the data currently displayed in a corresponding user interface 1001-1, such as a graphical user interface (GUI). The state information may include information about the list data to be displayed, the available display area in the user interface 1001 (e.g., the dimensions of the display area, the location and size of display controls, the location and size of other elements in the user interface, etc.), the segment of the list data currently displayed in the available display area (e.g., which list items fit within the available display area), a user identifier and/or display settings or preferences associated with the user identifier. Accordingly, as the state information associated with the user interface 1001 changes in response to input received from a user or another application, the analytics engine 1010 can access the data store 1020 to retrieve additional list data, analyze or re-analyze the list data to generate the previews defined in one or more of the analytic definitions 1017.

For the example, the computing device 110, through a corresponding user interface 1001, may receive user input that changes the segment of the list data displayed in the available display area (e.g., a command/or gesture that indicates scrolling through the list items in the list data). The input can be sent to the analytics engine 1010 to reanalyze the list data to generate updates to one or more previews associated with the list data and the visible segment of the list data in the available display area. In one embodiment, generating an update to one or more the previews may include expanding or contracting the number of all screen list items included in the composite row. In another embodiment, generating and update to one or more of the previews may include calculating a range corresponding to the segment of the distribution of the values displayed in the visible list items, and rendering a correspondingly sized slider bar.

In FIG. 10, the components in the cloud computing environment 1005 are shown as being instantiated separately from the user interfaces 1001. However, in some embodiments, the analytics engine, the data store 1020, and the user interfaces 1001 may be instantiated on a common computing device 110. Accordingly, all the functionality and data required for generating various previews described herein may be implemented in separate computing systems or on a single computing device 110.

Figure 11:
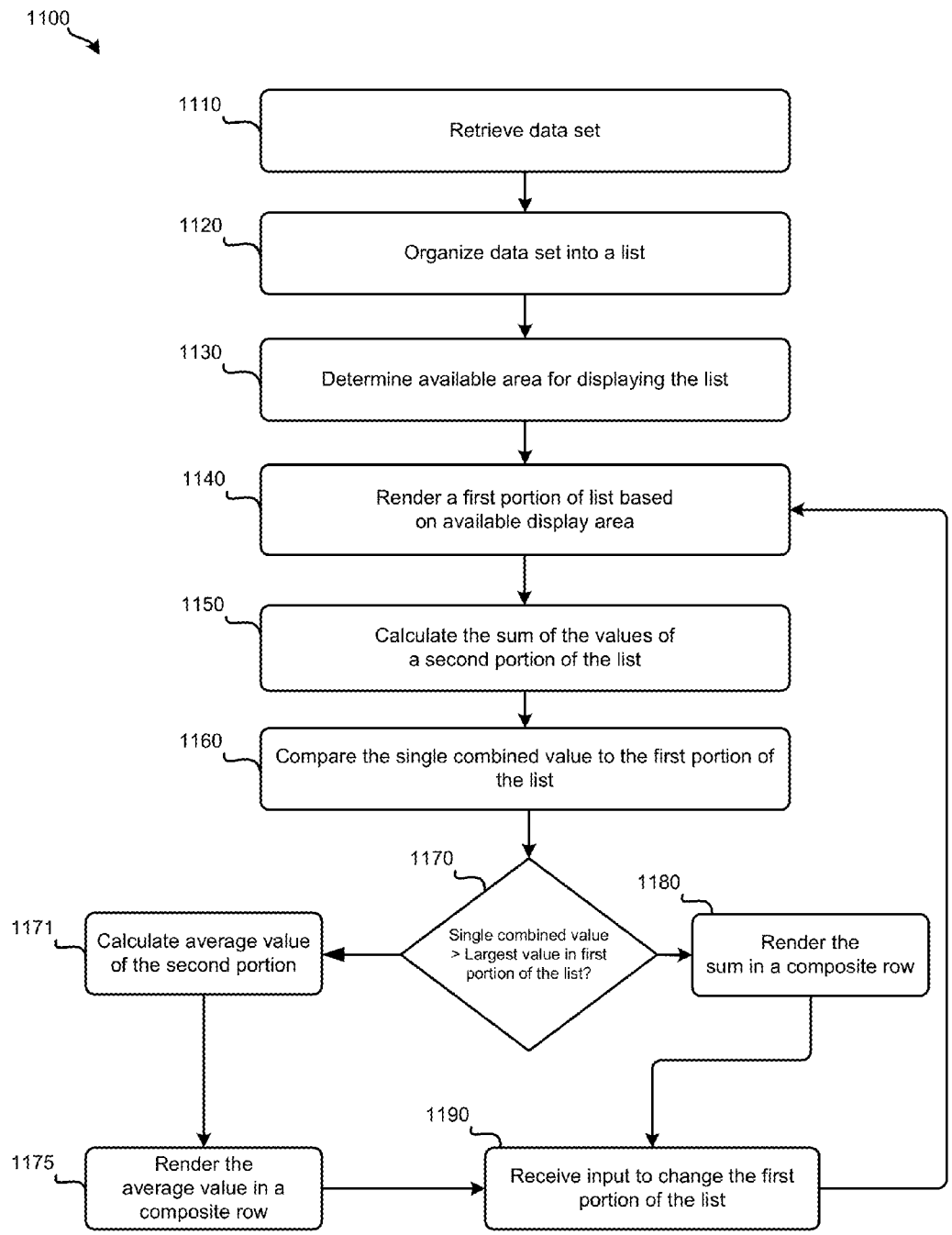
FIG. 11 is a flow chart of a method for generating summary composite row type previews of list data according to one embodiment of the present disclosure.

FIG. 11 is a flowchart of a method 1100 for generating a user interface with a preview of off-screen list items according to various embodiments the present disclosure. The method 1100 can begin in action 1110 when an analytics engine 1010 instantiated on one or more computer systems retrieves a data set from a data store 1020. Retrieving the data set from the data store 1020 may be in response to input received from a computing device 110. Accordingly, the input can be received through the user interface 1001 displayed on a display device 113 of the computing device 110.

In action 1120, the analytics engine 1010 can organize the data into a list. In some embodiments, the list may include a table having one or more rows and one or more columns comprising values from the data set. Each row can represent an individual list item. Accordingly, the list items may be organized by ordering rows according to values in one or more of the columns.

In action 1130, the analytics engine may determine the available area for displaying the list in a corresponding user interface 1001. In one embodiment, determining the available display area may include receiving specifications or preferences from the computing device 110 about the size of the particular display device 113 or a window 119 rendered in a particular user interface 1001. In other embodiments, the analytics engine 1010 may retrieve the specifications for the available area from one or more analytic definitions 1017 associated with the input received from the client computing device 110. Based on the available area in the user interface 1001, the analytics engine may render a first segment of the list (e.g., a number of list items that fit in the available display area). In some embodiments, the first segment of the list may include several list items with values arranged in ascending or descending order. Some or all of the list items may include a visual representation of one or more of the values included in the list items. For example, a list item may include a value of a particular measure and a bar graph element sized according to the value.

In action 1150, the analytics engine may calculate the sum of the values in a second segment of the list into a single combined value. The second segment of the list may include the remainder of the list items that cannot be fit into the available display area (i.e., off-screen list items). For example, the analytics engine 1010 may calculate the sum of the values for one or more measures included in the second segment of the list. In action 1160, the analytics engine may compare the sum of the values to the first segment of the list. In one embodiment, comparing the sum of the values with the first segment of the list may include calculating or otherwise determining the largest value of one or more measures in the list (e.g., the maximum value) and comparing the sum of the values with the largest value. In determination 1170, the analytics engine may evaluate the comparison. The comparison may include determining whether the sum of the values in the second segment of the list is greater than the largest value in the first segment of the list.

In determination 1170, the analytics engine 1010 can determine whether the sum of the values in the off-screen list items is greater than the largest value in the first segment of the list or some other threshold value. If the sum is greater than the largest value, then the analytics engine 1010 can calculate the average or mean value of the second segment of the list, in action 1171. In action 1175, the analytics engine 1010 can render the average value in a composite row in the available display area. In some embodiments, rendering the average value may include rendering a visual representation of the average value. The composite row can then be displayed with the list items in the first segment of the list on a display device 1013.

If the sum of the values in the off-screen list items is equal to or less than the largest value in the first segment of the list or a threshold value, then the analytics engine 1010 can render the sum in the composite row adjacent to the available display area, in action 1180. Rendering the sum may include rendering a composite visual representation of the component values in the sum. For example, the composite visual representation may include a stacked bar chart, as depicted in FIGS. 3A through 3D.

In action 1190, the analytics engine 1010 may receive input, from a user or other application, indicating a change to the first segment of the list. In one embodiment, the change to the first segment of the list may include scrolling up or down the list to change which list items of the list are displayed in the available display area. In response to the input, the analytics engine 1010 can render the new first segment of the list in the available display area, in action 1140. Actions 1150 through 1190 can then be repeated to generate a new preview of the off-screen list items based on the change to the first segment of the list. Accordingly, embodiments the present disclosure include generating previews of off-screen list items that are ordered either above or below the first segment of the list. In some embodiments, the second segment of the list includes only the off-screen list items ordered below the first segment of the list. In other embodiments, the second segment of the list includes all of the off-screen list items.

Figure 12:
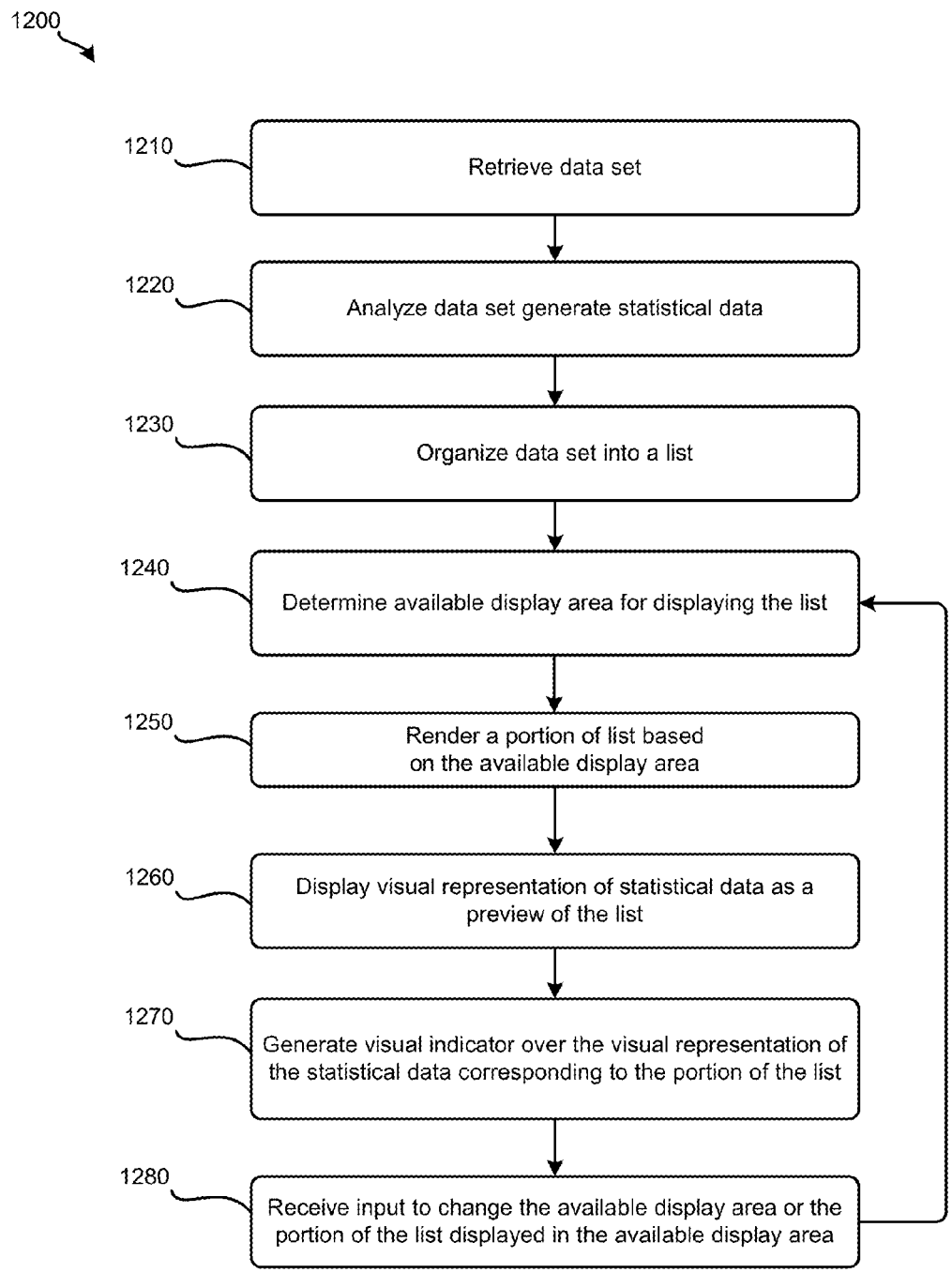
FIG. 12 is a flow chart of a method for generating scroll bar box plot previews of list data according to one embodiment of the present disclosure.

FIG. 12 is a flowchart of a method 1200 for generating a box plot scrollbar preview of list data in a space constrained display device 113, according to various embodiments the present disclosure. Method 1200 can begin at action 210, in which an analytics engine 1010, or other computer system, retrieves the data set from a data store 1020. The data in the set may include a number of values for a number of measures organized into entries or rows in a table having multiple columns. In action 1220, the analytics engine 1010 can analyze the data set to calculate statistical data about the values in the data set. In one embodiment, the analytics engine 1010 can calculate the mean value, the median value, the mode, the lowest value, the greatest value, and the lower quartile value, the upper quartile, and other characteristics regarding the distribution of values in the list data.

In action 1230, the analytics engine 1010 can organize the data set into an ordered list of list items corresponding to the entries or rows in the table. As described herein, the list items can be ordered according to one or more measures with values in ascending or descending order.

In action 1240, the analytics engine 1010 can determine the available display area for displaying the list. Determining how much of spaces available for displaying the list can include receiving specifications or settings for the size or layout of the particular display device 113 or a window 119 rendered in a user interface 1001. Receiving the specifications or settings can include receiving a description of the available display area from a computing device 110. Alternatively receiving specifications or settings can include retrieving an analytic definition 1017 associated with the computing device 110, a display device 113, or a user.

In action 1250, the analytics engine 1010 can render a contiguous segment of the list based on the available display area. For example, a fixed number of lines of a fixed number of list items can be displayed in the available display area. The segment of the list can include the first and/or last item in the list and the adjacent number of list items that fit within the available display area. Alternatively, the first segment of the list may include any other contiguous segments of the ordered list.

In action 1260, the analytics engine 1010 can render and display a visual representation of the statistical data as a preview of the list. In one embodiment, the visual representation of the statistical data can include a box plot. The box plot can be superimposed in a scrollbar or other control element used to navigate through the list. In such embodiments, the box plot can include a shaded region of the scrollbar that indicates the locations of values in the list items corresponding to the lower quartile, the median, and the upper quartile.

In action 1270, the analytics engine 1010 can render and display a visual indicator over the visual representation of the statistical data scaled in size to represent the range in the distribution of values displayed in the segment of the list in the available display area. In some embodiments, the visual indicator may include a dynamically sized slider that can be rendered over one or more regions of the scrollbar or the box plot to indicate the spread of the values relative to the distribution of values displayed in the available display area.

In action 1280, the analytics engine 1010 can receive input from a user or other application to change the available display area or the segment of the list displayed in the available display area. As described herein, input to change the available display area for the segment of the list displayed in the available display area can include receiving user input through the user interface to resize the available display area or to scroll through the segment of the list displayed in the available display area. In response to the input, the analytics engine 1010 can repeat actions 1240 through 1270 to generate and display a new segment of the list in the available display area and the preview of the list in the form of a box plot and adaptive slider superimposed over a scrollbar associated with the available display area.

Figure 13:
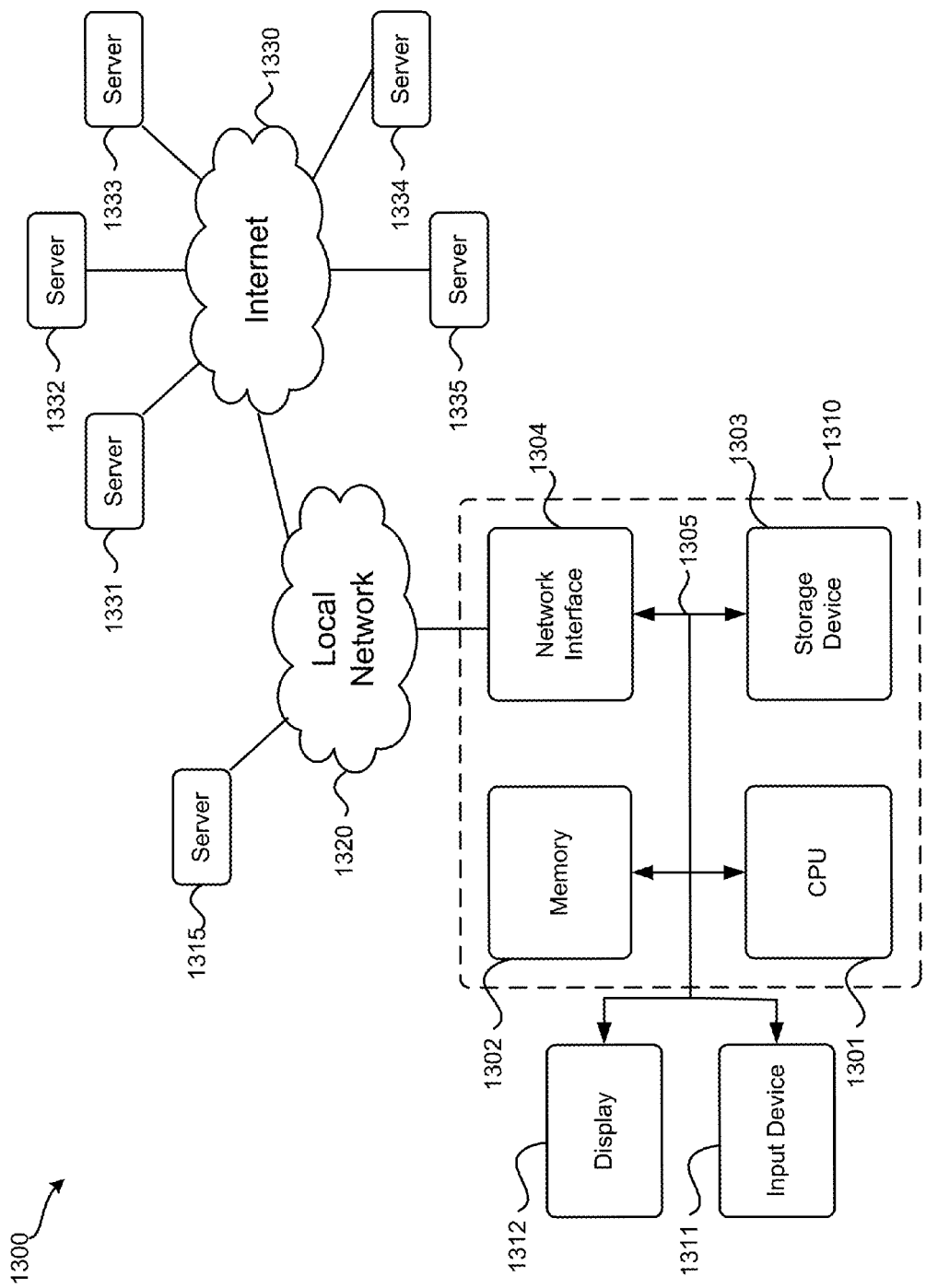
FIG. 13 illustrates a computer system that can be used to implement embodiments of the present disclosure.

FIG. 13 illustrates an example computer system and networks that may be used to implement embodiments of the present disclosure. Computer system 1310 includes a bus 1305 or other communication mechanism for communicating information, and a processor 1301 coupled with bus 1305 for processing information. Computer system 1310 also includes a memory 1302 coupled to bus 1305 for storing information and instructions to be executed by processor 1301, including instructions for performing the techniques described above. This memory may also be used for storing temporary variables or other intermediate information during execution of instructions to be executed by processor 1301. Possible implementations of this memory may be, but are not limited to, random access memory (RAM), read only memory (ROM), or both. A storage device 1303 is also provided for storing information and instructions. The information instructions can be in the form of computer readable code stored on the storage device, accessible and executable by processor to implement various techniques and methods of the present disclosure. Common forms of storage devices include non-transitory, non-volatile computer readable media, for example, a hard drive, a magnetic disk, an optical disk, a CD, a DVD, a flash memory, a USB memory card, or any other medium from which a computer can read.

Computer system 1310 may be coupled via the same or different information bus, such as bus 1305, to a display device 1312, such as a touchscreen, a liquid crystal display (LCD), and LED display, and the like, for displaying information. An input device 1311 such as a keyboard, touchscreen, and/or mouse is coupled to a bus for communicating information and command selections from the user to processor 1301. The combination of these components allows the user to communicate with the system. In some embodiments, the display 1312 and the input device 1311 may be implemented in a single device, such as a touchscreen.

Computer system 1310 also includes a network interface 1304 coupled with bus 1305. Network interface 1304 may provide two-way data communication between computer system 1310 and the local network 1320. The network interface 1304 may be a local area network (LAN) card to provide a data communication connection to a compatible LAN. The LAN card may include a wireless LAN (WLAN) card for communicating with a corresponding wireless network. In any such implementation, network interface 1304 sends and receives electrical, electromagnetic, or optical signals that carry digital data streams representing various types of information.

Computer system 1310 can send and receive information, including messages or other interface actions, through the network interface 1304 to an Intranet or the Internet 1330. In the Internet example, software components or services may reside on multiple different computer systems 1310 or servers 1331 across the network. Software components described above may be implemented on one or more servers. A server 1331 may transmit messages from one component, through Internet 1330, local network 1320, and network interface 1304 to a component on computer system 1310, for example. Software components of a composite application may be implemented on the same system as other components, or on a different machine than other software components. This process of sending and receiving information between software components may be applied to communication between computer system 1310 and any of the servers 1331 to 1335 in either direction. It may also be applied to communication between any two servers 1331 to 1335.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    retrieving, by a computer system, a plurality of list items from a data store, wherein each list item in the plurality of list items comprises a value;
    organizing, by the computer system, the plurality of list items into an ordered list of the plurality of list items based on the values of the plurality of list items;
    determining, by the computer system, an area in a display device available for displaying the ordered list;
    determining, by the computer system, a first subset of successive list items in the ordered list based on the area;
    analyzing, by the computer system, the ordered list to generate a first preview comprising a summary of at least some successive list items in the ordered list other than the first subset of successive list items;
    calculating, by the computer system, a sum of the values of the at least some successive list items in the ordered list other than the first subset of successive list items, wherein generating the first preview comprises generating a composite list item comprising the sum of the values;
    generating, by the computer system, a graphical user interface (GUI) sized to fit in the area, the GUI comprising the first subset of successive list items, the first preview, and a GUI control for scrolling through the ordered list;
    in response to receiving input through the GUI control to scroll through the ordered list:
    determining, by the computer system, a second subset of successive list items in the ordered list based on the area, the second subset of successive list items different than the first subset of the successive list items;
    analyzing, by the computer system, the ordered list to generate a second preview comprising a summary of at least some successive list items in the ordered list other than the second subset of successive list items; and
    updating, by the computer system, the GUI to display the second subset of successive list items and the second preview.

2. The method of claim 1, wherein analyzing the list comprises calculating statistical distribution data for the plurality of values, wherein the first preview further comprises a visual representation of the statistical distribution data.

3. The method of claim 2, wherein calculating the statistical distribution data comprises calculating a lower quartile value, a median value, and a upper quartile value of the plurality of values,
    wherein the visual representation of the statistical distribution data comprises a box plot comprising indications of the lower quartile value, the median value, and the upper quartile value.

4. The method of claim 2, wherein the first preview further comprises an indication of a location of the values in the first subset of the plurality of list items relative to the statistical distribution data.

5. The method of claim 1 further comprising:
    generating, by the computer system, a plurality of visual representations of the values in the plurality of list items,
    wherein generating the composite list item comprises generating, by the computer system, a composite visual representation comprising visual representations of the values of the at least some successive list items in the ordered list other than the first subset of successive list items.

6. The method of claim 1 further comprising:
    calculating, by the computer system, a mean value of the values of the at least some successive list items in the ordered list other than the first subset of successive list items,
    wherein generating the first preview comprises generating a composite list item comprising the mean value.

7. The method of claim 6 further comprising determining a list item in the first subset of successive list items having a largest value,
    wherein calculating the mean value is performed upon determining that the sum of the value is greater than the largest value,
    wherein generating the composite list item to comprise the mean value is performed upon determining that the sum of the value is greater than the largest value.

8. A non-transitory computer readable medium comprising instructions, that when executed by a computer processor cause the computer processor to be configured for:
  retrieving a plurality of list items from a data store, wherein each list item in the plurality of list items comprises a value;
  organizing the plurality of list items into an ordered list of the plurality of list items based on the values of the plurality of list items;
  determining an area in a display device available for displaying the ordered list;
  determining a first subset of successive list items in the ordered list based on the area;
  analyzing the ordered list to generate a first preview comprising a summary of at least some successive list items in the ordered list other than the first subset of successive list items;
  calculating a sum of the values of the at least some successive list items in the ordered list other than the first subset of successive list items, wherein generating the first preview comprises generating a composite list item comprising the sum of the values;
  generating a graphical user interface (GUI) sized to fit in the area, the GUI comprising the first subset of successive list items, the first preview, and a GUI control for scrolling through the ordered list;
  in response to receiving input through the GUI control to scroll through the ordered list:
  determining a second subset of successive list items in the ordered list based on the area, the second subset of successive list items different than the first subset of the successive list items;
  analyzing the ordered list to generate a second preview comprising a summary of at least some successive list items in the ordered list other than the second subset of successive list items; and
  updating the GUI to display the second subset of successive list items and the second preview.

9. The non-transitory computer readable medium of claim 8, wherein the instructions that cause the computer processor to be configured for analyzing the list comprise instructions that cause the computer processor to be configured for calculating statistical distribution data for the plurality of values, wherein the first preview further comprises a visual representation of the statistical distribution data.

10. The non-transitory computer readable medium of claim 9, wherein the instructions that cause the computer processor to be configured for calculating the statistical distribution data comprise instructions that cause the computer processor to be configured for calculating a lower quartile value, a median value, and a upper quartile value of the plurality of values,
  wherein the visual representation of the statistical distribution data comprises a box plot comprising indications of the lower quartile value, the median value, and the upper quartile value.

11. The non-transitory computer readable medium of claim 9, wherein the first preview further comprises an indication of a location of the values in the first subset of the plurality of list items relative to the statistical distribution data.

12. The non-transitory computer readable medium of claim 8, wherein the instructions further cause the computer processor to be configured for:
  generating a plurality of visual representations of the values in the plurality of list items,
  wherein generating the composite list item comprises generating, by the computer system, a composite visual representation comprising visual representations of the values of the at least some successive list items in the ordered list other than the first subset of successive list items.

13. The non-transitory computer readable medium of claim 8, wherein the instructions further cause the computer processor to be configured for:
  calculating a mean value of the values of the at least some successive list items in the ordered list other than the first subset of successive list items,
  wherein generating the first preview comprises generating a composite list item comprising the mean value.

14. The non-transitory computer readable medium of claim 13, wherein the instructions further cause the computer processor to be configured for determining a list item in the first subset of successive list items having a largest value,
  wherein calculating the mean value is performed upon determining that the sum of the value is greater than the largest value,
  wherein generating the composite list item to comprise the mean value is performed upon determining that the sum of the value is greater than the largest value.

15. A system comprising:
  a computer processor; and
  a non-volatile computer readable medium comprising instructions, that when executed by the computer processor, cause the computer processor to be configured to:
  retrieve a plurality of list items from a data store, wherein each list item in the plurality of list items comprises a value;
  organize the plurality of list items into an ordered list of the plurality of list items based on the values of the plurality of list items;
  determine an area in a display device available for displaying the ordered list;
  determine a first subset of successive list items in the ordered list based on the area;
  analyze the ordered list to generate a first preview comprising a summary of at least some successive list items in the ordered list other than the first subset of successive list items;
  calculate a sum of the values of the at least some successive list items in the ordered list other than the first subset of successive list items, wherein generating the first preview comprises generating a composite list item comprising the sum of the values;
  generate a graphical user interface (GUI) sized to fit in the area, the GUI comprising the first subset of successive list items, the first preview, and a GUI control for scrolling through the ordered list;
  in response to receiving input through the GUI control to scroll through the ordered list:
  determine a second subset of successive list items in the ordered list based on the area, the second subset of successive list items different than the first subset of the successive list items;
  analyze the ordered list to generate a second preview comprising a summary of at least some successive list items in the ordered list other than the second subset of successive list items; and
  update the GUI to display the second subset of successive list items and the second preview.

16. The system of claim 15, wherein the instructions that cause the computer processor to be configured to analyze the list comprise instructions that cause the computer processor to be configured to calculate statistical distribution data for the plurality of values, wherein the first preview further comprises a visual representation of the statistical distribution data.

17. The system of claim 16, wherein the instructions that cause the computer processor to be configured to calculate the statistical distribution data comprise instructions that cause the computer processor to be configured to calculate a lower quartile value, a median value, and a upper quartile value of the plurality of values,
- wherein the visual representation of the statistical distribution data comprises a box plot comprising indications of the lower quartile value, the median value, and the upper quartile value.

18. The system of claim 16, wherein the first preview further comprises an indication of a location of the values in the first subset of the plurality of list items relative to the statistical distribution data.

19. The system of claim 15, wherein the instructions further cause the computer processor to be configured to:
- generating a plurality of visual representations of the values in the plurality of list items,
- wherein the instructions that cause the computer processor to be configured to generate the composite list item comprise instructions that cause the computer processor to be configured to generate a composite visual representation comprising visual representations of the values of the at least some successive list items in the ordered list other than the first subset of successive list items.

20. The system of claim 15, wherein the instructions further cause the computer processor to be configured to:
- calculate a mean value of the values of the at least some successive list items in the ordered list other than the first subset of successive list items,
- wherein generating the first preview comprises generating the composite list item comprising the mean value; and
- determine a list item in the first subset of successive list items having a largest value,
- wherein calculating the mean value is performed upon determining that the sum of the value is greater than the largest value,
- wherein generating the composite list item comprising the mean value is performed upon determining that the sum of the value is greater than the largest value.

* * * * *